US012666006B2

(12) United States Patent
Ramasubramonian et al.

(10) Patent No.: US 12,666,006 B2
(45) Date of Patent: Jun. 23, 2026

(54) INTER PREDICTION CANDIDATE SELECTION IN POINT CLOUD COMPRESSION

(71) Applicant: QUALCOMM Incorporated, San Diego, CA (US)

(72) Inventors: Adarsh Krishnan Ramasubramonian, Irvine, CA (US); Geert Van der Auwera, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/612,724

(22) Filed: Mar. 21, 2024

(65) Prior Publication Data

US 2024/0348769 A1 Oct. 17, 2024

Related U.S. Application Data

(60) Provisional application No. 63/496,669, filed on Apr. 17, 2023.

(51) Int. Cl.
*H04N 19/105* (2014.01)
*H04N 19/503* (2014.01)
*H04N 19/51* (2014.01)
*H04N 19/597* (2014.01)
*H04N 19/70* (2014.01)

(52) U.S. Cl.
CPC ......... *H04N 19/105* (2014.11); *H04N 19/503* (2014.11); *H04N 19/51* (2014.11); *H04N 19/597* (2014.11); *H04N 19/70* (2014.11)

(58) Field of Classification Search
None
See application file for complete search history.

(56) References Cited

U.S. PATENT DOCUMENTS

2019/0045192 A1* 2/2019 Socek .................. H04N 19/573
2022/0337872 A1* 10/2022 Park ..................... H04N 19/172
2023/0102401 A1 3/2023 Ramasubramonian et al.

OTHER PUBLICATIONS

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
International Search Report and Written Opinion—PCT/US2024/023692—ISA/EPO—Jul. 16, 2024 15 Pages.

(Continued)

*Primary Examiner* — Christopher Braniff
(74) *Attorney, Agent, or Firm* — Shumaker & Sieffert, P.A.

(57) ABSTRACT

Techniques and devices are described for processing point cloud data. An example device includes one or more memories and one or more processors. The one or more processors are configured to process a syntax element indicative of whether a previous previous frame can be used for inter prediction for one or more points of point cloud data. The previous previous frame includes a reference frame of a previous reference frame. The one or more processors are configured to code the one or more points based on a determination of whether the previous previous frame can be used for inter prediction for the one or more points.

18 Claims, 14 Drawing Sheets

(56) References Cited

OTHER PUBLICATIONS

Loi K.L (Panasonic)., et al., "[G-PCC][EE13.2] Report on Inter Prediction Test 6 for Predictive Geometry", 142. MPEG Meeting, Apr. 24, 2023-Apr. 28, 2023, Antalya, (Motion Picture Expert Group or ISO/IEC JTC1/SC29/WG11), No. m62512, Apr. 14, 2023, 9 Pages, XP030309492, the whole document.

Ramasubramonian A.K (Qualcomm)., et al., "[G-PCC] Thoughts on EE13.2 Test 8—Inter Prediction in Predictive Geometry Coding", 141. MPEG Meeting, Jan. 16, 2023-Jan. 20, 2023, Online, (Motion Picture Expert Group or ISO/IEC JTC1/SC29/WG11), No. m62218, Jan. 11, 2023, 2 Pages, XP030308038, The Whole Document.

WG 7, MPEG 3D Graphics and Haptics Coding: "G-PCC 2" Edition Codec Description, 139. MPEG Meeting, Jul. 18, 2022-Jul. 22, 2022, Online, (Motion Picture Expert Group or ISO/IEC JTC1/SC29/WG11), No. n21684, Oct. 20, 2022, pp. 1-63, XP030306169, Sections 6 and 7.

* cited by examiner

1000

PROCESSING A SYNTAX ELEMENT INDICATIVE OF WHETHER A PREVIOUS PREVIOUS FRAME CAN BE USED FOR INTER PREDICTION FOR ONE OR MORE POINTS OF THE POINT CLOUD DATA, WHEREIN THE PREVIOUS PREVIOUS FRAME INCLUDES A REFERENCE FRAME OF A PREVIOUS REFERENCE FRAME

1002

CODE THE ONE OR MORE POINTS BASED ON A DETERMINATION OF WHETHER THE PREVIOUS PREVIOUS FRAME CAN BE USED FOR INTER PREDICTION FOR THE ONE OR MORE POINTS

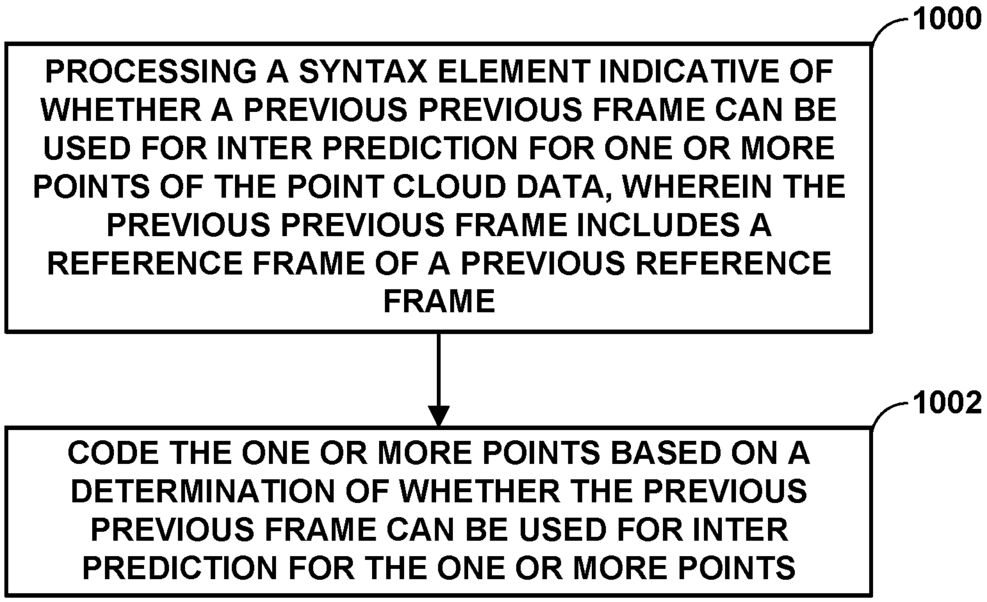

FIG. 10

INTER PREDICTION CANDIDATE SELECTION IN POINT CLOUD COMPRESSION

This application claims the benefit of U.S. Provisional Patent Application 63/496,669, filed Apr. 17, 2023, the entire content of which is incorporated by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques for inter prediction candidate selection for point cloud compression. Such techniques may include the selection of a reference frame for inter prediction and/or the determination of an inter predictor candidate list.

The selection of candidates and reference frames in point cloud compression, in some example implementations, is limited to choosing between a so called previous previous frame or a previous global motion compensated frame. Such techniques do not allow the use of a global motion compensated previous previous frame or the use of a resampled previous reference frame. However, in some cases a global motion compensated previous previous frame or a resampled previous reference frame may provide for better prediction and therefore a better quality reconstruction of the point cloud by a point cloud coder and/or fewer bits used to transmit residuals from between a point cloud encoder and a point cloud decoder. As such, it may be desirable to allow the selection of a global motion compensated previous previous frame or the use of a resampled previous reference frame for inter prediction of point cloud data. The techniques of this disclosure may include the use of an additional syntax element whose value may be indicative of whether a previous previous frame is permitted to be used for inter prediction for the point cloud data to which the additional syntax element is applicable.

In one example, this disclosure describes a method of processing point cloud data including processing a syntax element indicative of whether a previous previous frame can be used for inter prediction for one or more points of the point cloud data, wherein the previous previous frame comprises a reference frame of a previous reference frame; and coding the one or more points based on a determination of whether the previous previous frame can be used for inter prediction for the one or more points.

In another example, this disclosure describes a device for processing a point cloud, the device including: one or more memories configured to store point cloud data; and one or more processors implemented in circuitry and communicatively coupled to the one or more memories, the one or more processors configured to: process a syntax element indicative of whether a previous previous frame can be used for inter prediction for one or more points of the point cloud data, wherein the previous previous frame comprises a reference frame of a previous reference frame; and code the one or more points based on a determination of whether the previous previous frame can be used for inter prediction for the one or more points.

In another example, this disclosure describes non-transitory computer-readable storage media including instructions, which when executed, cause one or more processors to: process a syntax element indicative of whether a previous previous frame can be used for inter prediction for one or more points of point cloud data, wherein the previous previous frame comprises a reference frame of a previous reference frame; and code the one or more points based on a determination of whether the previous previous frame can be used for inter prediction for the one or more points.

The details of one or more examples are set forth in the accompanying drawings and the description below. Other features, objects, and advantages will be apparent from the description, drawings, and claims.

BRIEF DESCRIPTION OF DRAWINGS

FIG. 10 is a flow diagram illustrating example inter prediction candidate selection techniques in accordance with one or more aspects of this disclosure.

DETAILED DESCRIPTION

The selection of candidates and reference frames in point cloud compression in some example implementations is limited to choosing between a so called previous previous frame or a previous global motion compensated frame. Such techniques do not allow the use of a global motion compensated previous previous frame or the use of a resampled previous reference frame. However, in some cases a global motion compensated previous previous frame or a resampled previous reference frame may provide for better prediction and therefore a better quality reconstruction of the point cloud by a point cloud coder and/or fewer bits used to transmit residuals from between a point cloud encoder and a point cloud decoder. As such, it may be desirable to allow the selection of global motion compensated previous previous frame or the use of a resampled previous reference frame for inter prediction of point cloud data.

Figure 1:
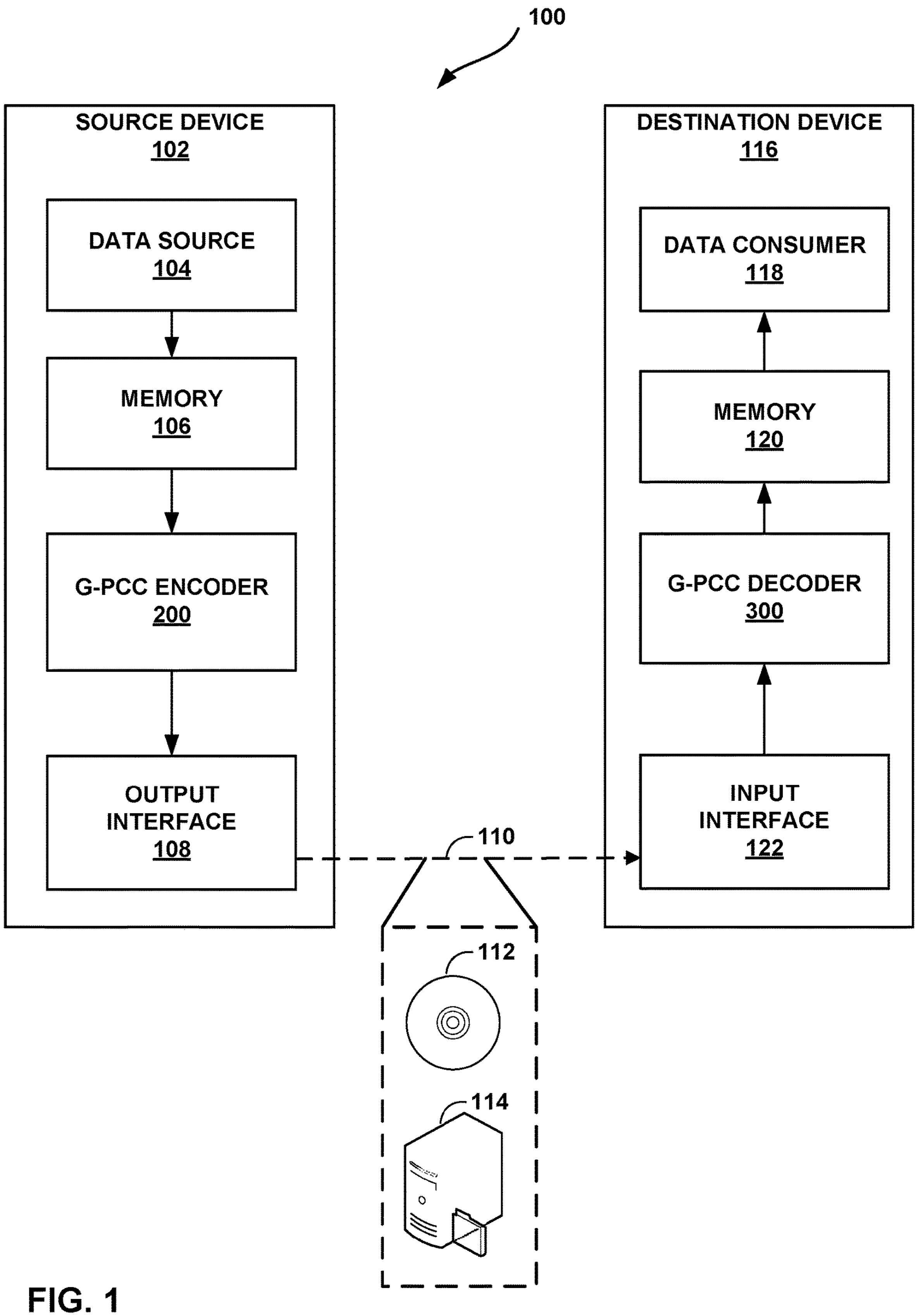
FIG. 1 is a block diagram illustrating an example encoding and decoding system that may perform the techniques of this disclosure.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110.

Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to inter prediction candidate selection in point cloud compression. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to inter prediction candidate selection in point cloud compression. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11), and more recently ISO/IEC MPEG 3DG (JTC 1/SC29/WG 7), are studying the potential need for standardization of point cloud coding technology with a compression capability that significantly exceeds that of the current approaches. MPEG is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in ISO/IEC FDIS 23090-9 Geometry-based Point Cloud Compression, ISO/IEC JTC 1/SC29/WG 7 m55637, Teleconference, October 2020, and a description of the codec is available in G-PCC Codec Description, ISO/IEC JTC 1/SC29/WG 7 MDS20983, Teleconference, October 2021.

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
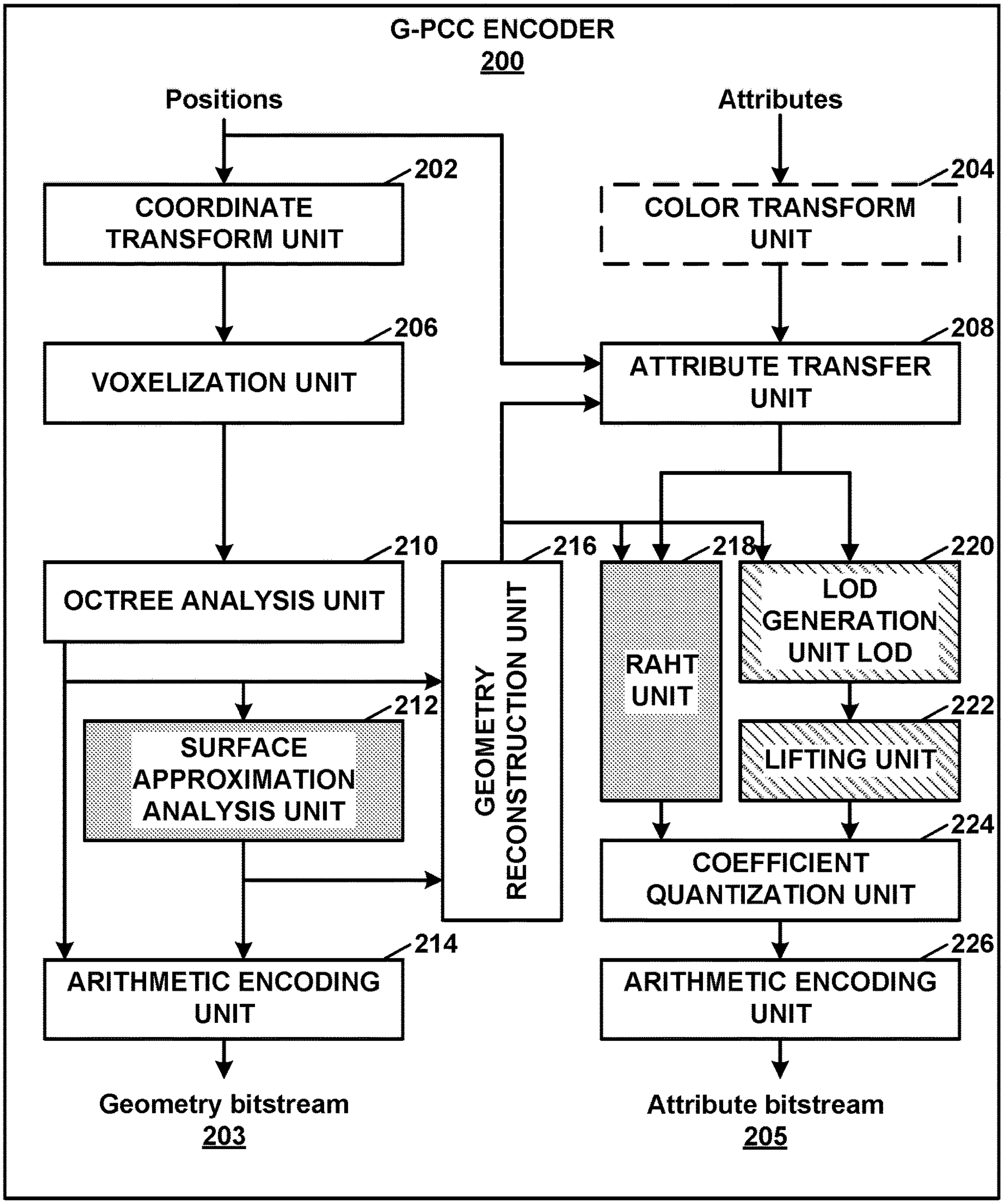
FIG. 2 is a block diagram illustrating an example Geometry Point Cloud Compression (G-PCC) encoder.
Figure 3:
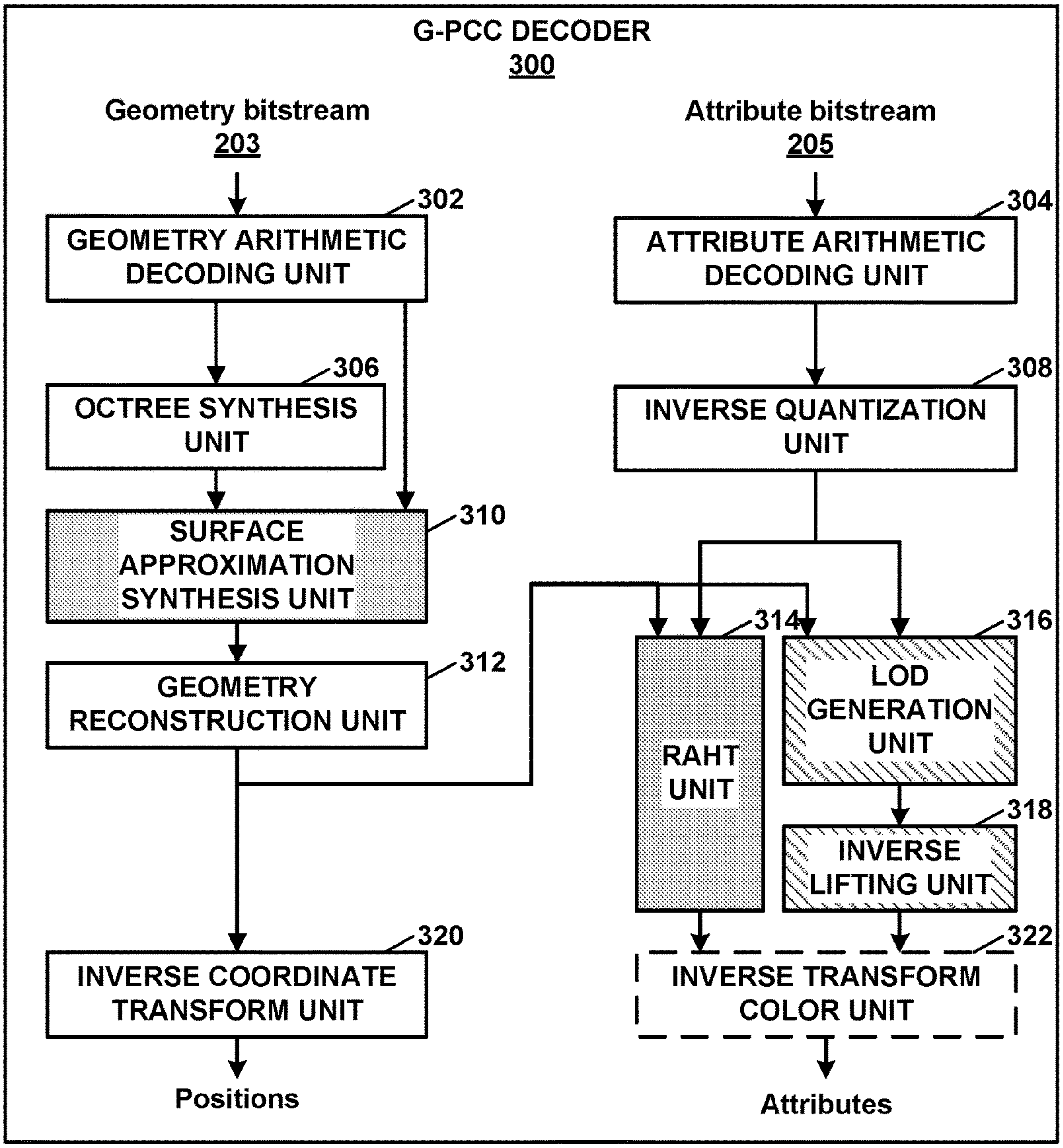
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, the gray-shaded modules are options typically used for Category 1 data. Diagonal-crosshatched modules are options typically used for Category 3 data. All the other modules are common between Categories 1 and 3.

For geometry, octree and/or predictive-tree coding may be utilized. For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Figure 4:
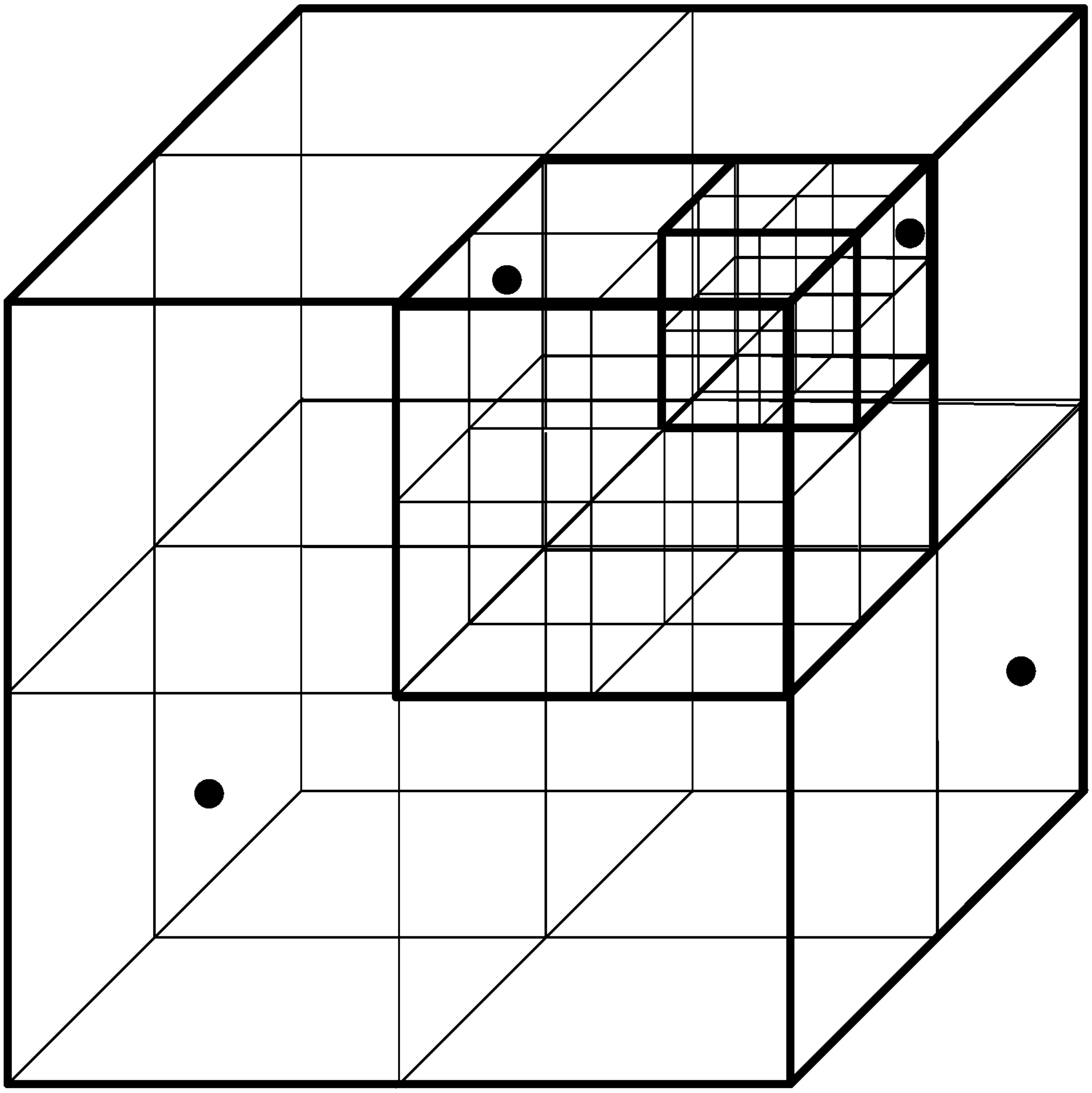
FIG. 4 is an example Octree split for geometry coding according to the techniques of this disclosure.

FIG. 4 is an example Octree split for geometry coding according to the techniques of this disclosure.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At G-PCC encoder 200, the residuals obtained as the output of the coding methods for the attributes are quantized. The residuals may be obtained by subtracting the attribute value from a prediction that is derived based on the points in the neighborhood of the current point and based on the attribute values of points encoded previously. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may obtain a set of positions of points in the point cloud and a set of attributes. G-PCC encoder 200 may obtain the set of positions of the points in the point cloud and the set of attributes from data source 104 (FIG. 1). The positions may include coordinates of points in a point cloud. The attributes may include information about the points in the point cloud, such as colors associated with points in the point cloud. G-PCC encoder 200 may generate a geometry bitstream 203 that includes an encoded representation of the positions of the points in the point cloud. G-PCC encoder 200 may also generate an attribute bitstream 205 that includes an encoded representation of the set of attributes.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in geometry bitstream 203. Geometry bitstream 203 may also include other syntax elements, including syntax elements that are not arithmetically encoded.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. In some examples, under RAHT, the attributes of a block of 2×2×2 point positions are taken and transformed along one direction to obtain four low (L) and four high (H) frequency nodes. Subsequently, the four low frequency nodes (L) are transformed in a second direction to obtain two low (LL) and two high (LH) frequency nodes. The two low frequency nodes (LL) are transformed along a third direction to obtain one low (LLL) and one high (LLH) frequency node. The low frequency node LLL corresponds to DC coefficients and the high frequency nodes H, LH, and LLH correspond to AC coefficients. The transformation in each direction may be a 1-D transform with two coefficient weights. The low frequency coefficients may be taken as coefficients of the 2×2×2 block for the next higher level of RAHT transform and the AC coefficients are encoded without changes; such transformations continue until the top root node. The tree traversal for encoding is from top to bottom used to calculate the weights to be used for the coefficients; the transform order is from bottom to top. The coefficients may then be quantized and coded.

Alternatively or additionally, LOD generation unit 220 and lifting unit 222 may apply LOD processing and lifting, respectively, to the attributes of the reconstructed points. LOD generation is used to split the attributes into different refinement levels. Each refinement level provides a refinement to the attributes of the point cloud. The first refinement level provides a coarse approximation and contains few points; the subsequent refinement level typically contains more points, and so on. The refinement levels may be constructed using a distance-based metric or may also use one or more other classification criteria (e.g., subsampling from a particular order). Thus, all the reconstructed points may be included in a refinement level. Each level of detail is produced by taking a union of all points up to particular refinement level: e.g., LOD1 is obtained based on refinement level RL1, LOD2 is obtained based on RL1 and RL2, . . . LODN is obtained by union of RL1, RL2, . . . RLN. In some cases, LOD generation may be followed by a prediction scheme (e.g., predicting transform) where attributes associated with each point in the LOD are predicted from a weighted average of preceding points, and the residual is quantized and entropy coded. The lifting scheme builds on top of the predicting transform mechanism, where an update operator is used to update the coefficients and an adaptive quantization of the coefficients is performed.

RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in attribute bitstream 205. Attribute bitstream 205 may also include other syntax elements, including non-arithmetically encoded syntax elements.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LoD generation unit 316, an inverse lifting unit 318, an inverse transform coordinate unit 320, and an inverse transform color unit 322.

G-PCC decoder 300 may obtain a geometry bitstream 203 and attribute bitstream 205. Geometry arithmetic decoding unit 302 of G-PCC decoder 300 may apply arithmetic decoding (e.g., Context-Adaptive Binary Arithmetic Coding (CABAC) or other type of arithmetic decoding) to syntax elements in geometry bitstream 203. Similarly, attribute arithmetic decoding unit 304 may apply arithmetic decoding to syntax elements in attribute bitstream 205.

Octree synthesis unit 306 may synthesize an octree based on syntax elements parsed from geometry bitstream 203. Starting with the root node of the octree, the occupancy of each of the eight children node at each octree level is signaled in the bitstream. When the signaling indicates that a child node at a particular octree level is occupied, the occupancy of children of this child node is signaled. The signaling of nodes at each octree level is signaled before proceeding to the subsequent octree level. At the final level of the octree, each node corresponds to a voxel position; when the leaf node is occupied, one or more points may be specified to be occupied at the voxel position. In some instances, some branches of the octree may terminate earlier than the final level due to quantization. In such cases, a leaf node is considered an occupied node that has no child nodes. In instances where surface approximation is used in geometry bitstream 203, surface approximation synthesis unit 310 may determine a surface model based on syntax elements parsed from geometry bitstream 203 and based on the octree.

Furthermore, geometry reconstruction unit 312 may perform a reconstruction to determine coordinates of points in a point cloud. For each position at a leaf node of the octree, geometry reconstruction unit 312 may reconstruct the node position by using a binary representation of the leaf node in the octree. At each respective leaf node, the number of points at the respective leaf node is signaled; this indicates the number of duplicate points at the same voxel position. When geometry quantization is used, the point positions are scaled for determining the reconstructed point position values.

Inverse transform coordinate unit 320 may apply an inverse transform to the reconstructed coordinates to convert the reconstructed coordinates (positions) of the points in the point cloud from a transform domain back into an initial domain. The positions of points in a point cloud may be in floating point domain but point positions in G-PCC codec are coded in the integer domain. The inverse transform may be used to convert the positions back to the original domain.

Additionally, in the example of FIG. 3, inverse quantization unit 308 may inverse quantize attribute values. The attribute values may be based on syntax elements obtained from attribute bitstream 205 (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. RAHT decoding is done from the top to the bottom of the tree. At each level, the low and high frequency coefficients that are derived from the inverse quantization process are used to derive the constituent values. At the leaf node, the values derived correspond to the attribute values of the coefficients. The weight derivation process for the points is similar to the process used at G-PCC encoder 200. Alternatively, LOD generation unit 316 and inverse lifting unit 318 may determine color values for points of the point cloud using a level of detail-based technique. LOD generation unit 316 decodes each LOD giving progressively finer representations of the attribute of points. With a predicting transform, LOD generation unit 316 derives the prediction of the point from a weighted sum of points that are in prior LODs, or previously reconstructed in the same LOD. LOD generation unit 316 may add the prediction to the residual (which is obtained after inverse quantization) to obtain the reconstructed value of the attribute. When the lifting scheme is used, LOD generation unit 316 may also include an update operator to update the coefficients used to derive the attribute values. LOD generation unit 316 may also apply an inverse adaptive quantization in this case.

Furthermore, in the example of FIG. 3, inverse transform color unit 322 may apply an inverse color transform to the color values. The inverse color transform may be an inverse of a color transform applied by color transform unit 204 of G-PCC encoder 200. For example, color transform unit 204 may transform color information from an RGB color space to a YCbCr color space. Accordingly, inverse transform color unit 322 may transform color information from the YCbCr color space to the RGB color space.

The various units of FIG. 2 and FIG. 3 are illustrated to assist with understanding the operations performed by G-PCC encoder 200 and G-PCC decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Figure 5:
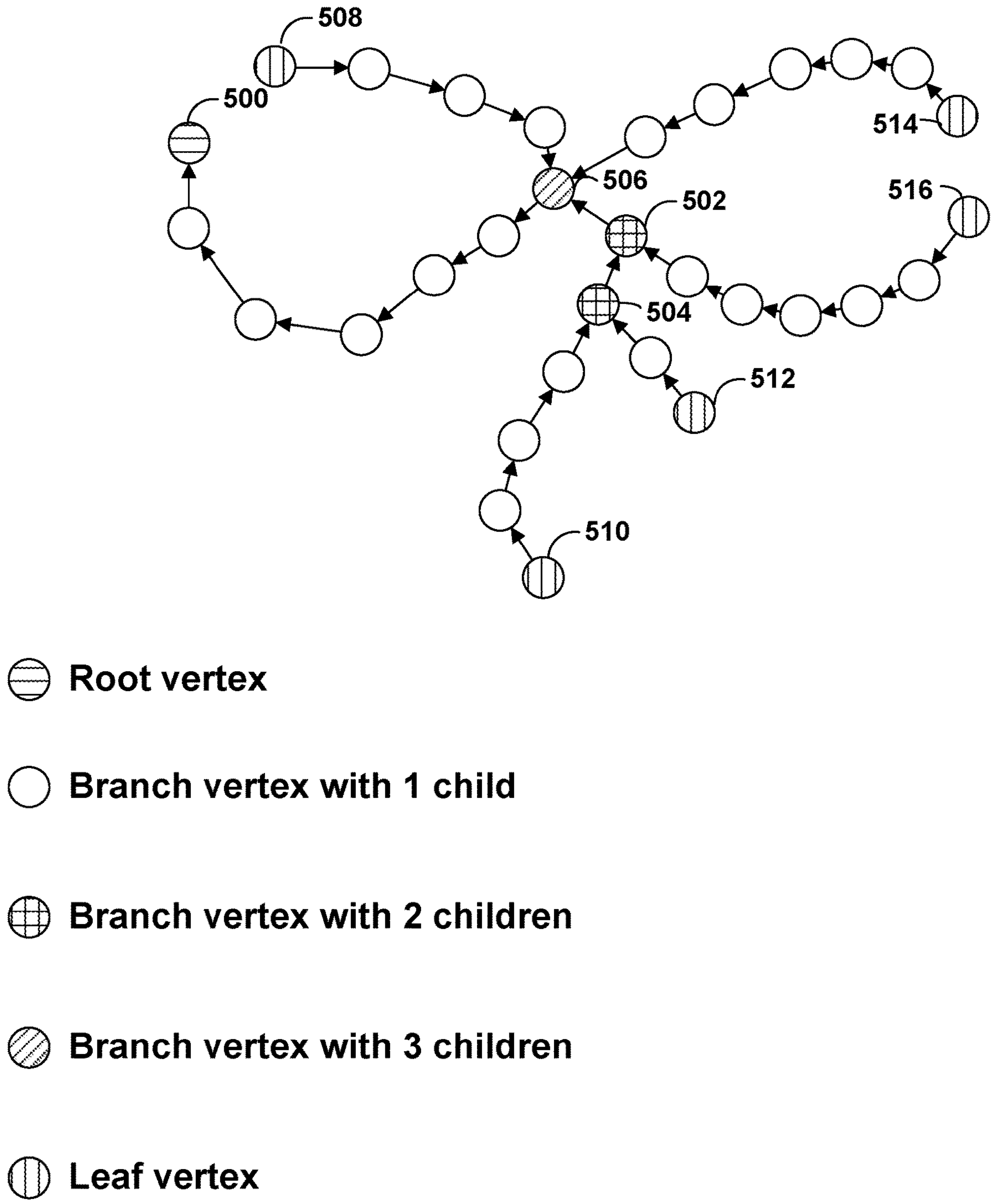
FIG. 5 is a conceptual diagram illustrating an example of a prediction tree, in accordance with one or more techniques of this disclosure.

Predictive geometry coding (see G-PCC $2^{nd}$ Edition Codec Description, ISO/IEC JTC 1/SC29/WG 7 MDS21684, Teleconference, July 2022) was introduced as an alternative to the octree geometry coding, where the nodes are arranged in a tree structure (which defines the prediction structure), and various prediction strategies are used to predict the coordinates of each node in the tree with respect to its predictors. FIG. 5 shows an example of a prediction tree, a directed graph where the arrow point to the prediction direction. The horizontal-hashed node is the root vertex and has no predictors; the crosshatched nodes have two children; the diagonal-hashed node has 3 children; the non-hashed nodes have one child and the vertical-hashed nodes are leaf nodes and these have no children. Every node, aside from the root node, has only one parent node.

FIG. 5 is a conceptual diagram illustrating an example of a prediction tree. Node 500 is the root vertex and has no predictors. Nodes 502 and 504 have two children. Node 506 has 3 children. Nodes 508, 510, 512, 514, and 516 are leaf nodes and these have no children. The remaining nodes each have one child. Every node aside from root node 500 has only one parent node.

Four prediction strategies are specified for each node based on its parent (p0), grand-parent (p1) and great-grand-parent (p2):

No prediction/zero prediction (0)

Delta prediction (p0)

Linear prediction (**2*p0−p1**)

Parallelogram prediction (p0+p1−p2)

G-PCC encoder 200 may employ any algorithm to generate the prediction tree; the algorithm used may be determined based on the application/use case and several strategies may be used. Some strategies are described in the G-PCC 2nd Edition Codec Description, ISO/IEC JTC 1/SC29/WG 7 MDS21684, Teleconference, July 2022.

For each node, the residual coordinate values are coded in the bitstream starting from the root node in a depth-first manner. For example, G-PCC encoder 200 may code the residual coordinate values in the bitstream.

For each node, the residual coordinate values are coded in the bitstream starting from the root node in a depth-first manner. For example, G-PCC encoder 200 may code the residual coordinate values in the bitstream.

Predictive geometry coding is useful mainly for Category 3 (LIDAR-acquired) point cloud data, e.g., for low-latency applications.

Figure 6A:
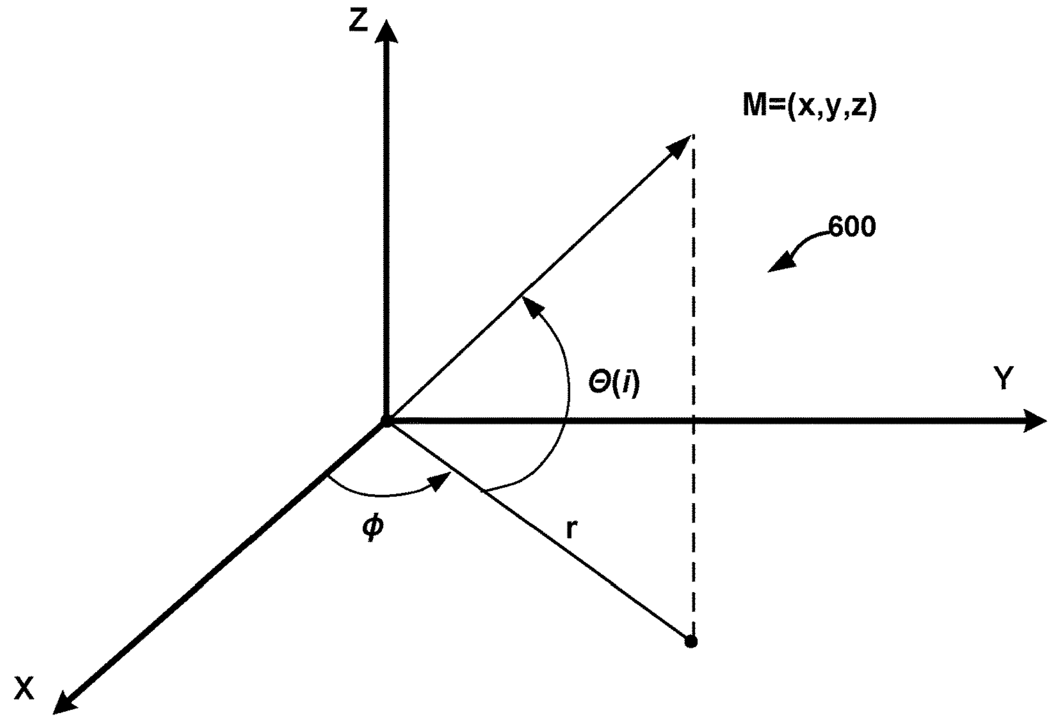
FIGS. 6A and 6B are conceptual diagrams illustrating an example of a spinning Light Detection and Ranging (LIDAR) acquisition model, in accordance with one or more techniques of this disclosure.
Figure 6B:
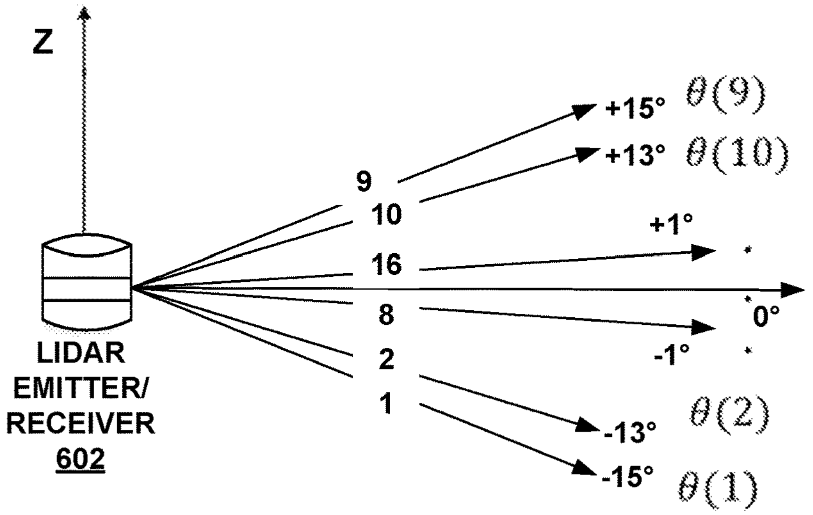

FIGS. 6A and 6B are conceptual diagrams illustrating an example of a spinning LIDAR acquisition model. Angular mode for predictive geometry coding is now described. Angular mode may be used in predictive geometry coding, where the characteristics of LIDAR sensors may be utilized in coding the prediction tree more efficiently. The coordinates of the positions are converted to the (r, ϕ, i) (radius, azimuth and laser index) domain 600 and a prediction is performed in this domain 600 (e.g., the residuals are coded in r, ϕ, i domain). Due to the errors in rounding, coding in r, ϕ, i is not lossless and hence a second set of residuals may be coded which correspond to the Cartesian coordinates. A description of the encoding and decoding strategies used for angular mode for predictive geometry coding is reproduced below from the G-PCC Codec Description.

The angular mode technique may focus on point clouds acquired using a spinning LIDAR model. Here, LIDAR 602 has N lasers (e.g., N=16, 32, 64) spinning around the Z axis according to an azimuth angle ϕ. Each laser may have different elevation $\theta(i)_{i=1 \ldots N}$ and height $ç(i)_{i=1 \ldots N}$. For example, the laser i may hit a point M, with cartesian integer coordinates (x, y, z), defined according to the coordinate system shown in FIGS. 6A-6B.

This technique models the position of M with three parameters (r, ϕ, i), which are computed as follows:

$$r = \sqrt{x^2 + y^2}$$

$$\phi = a\tan 2(y, x)$$

$$i = \arg\min_{j=1 \ldots N} \{z + \varsigma(j) - r \times \tan(\theta(j))\},$$

More precisely, the technique uses the quantized version of (r, ϕ, i), denoted (r̃, ϕ̃, i), where the three integers r̃, ϕ̃ and i are computed as follows:

$$\tilde{r} = \text{floor}\left(\frac{\sqrt{x^2 + y^2}}{q_r} + o_r\right) = \text{hypot}(x, y)$$

$$\tilde{\phi} = \text{sign}(a\tan 2(y, x)) \times \text{floor}\left(\frac{|a\tan 2(y, x)|}{q_\phi} + o_\phi\right)$$

$$i = \arg\min_{j=1 \ldots N} \{z + \varsigma(j) - r \times \tan(\theta(j))\}$$

where $(q_r, o_r)$ and $(q_\phi, o_\phi)$ are quantization parameters controlling the precision of ϕ̃ and r̃, respectively. sign(t) is a function that returns 1 if t is positive and (−1) otherwise. |t| is the absolute value of t.

To avoid reconstruction mismatches due to the use of floating-point operations, the values of $ç(i)_{i=1 \ldots N}$ and tan $(\theta(i))_{i=1 \ldots N}$ are pre-computed and quantized as follows:

$$\tilde{z}(i) = \text{sign}(\varsigma(i)) \times \text{floor}\left(\frac{|\varsigma(i)|}{q_\varsigma} + o_\varsigma\right)$$

$$\tilde{t}(i) = \text{sign}\left(\varsigma(\tan(\theta(j))) \times \text{floor}\left(\frac{|\tan(\theta(j))|}{q_\theta} + o_\theta\right)\right.$$

where $(q_ç, o_ç)$ and $(q_\theta, o_\theta)$ are quantization parameters controlling the precision of ç̃ and θ̃, respectively.

The reconstructed cartesian coordinates are obtained as follows:

$$\hat{x} = \text{round}(\tilde{r} \times q_r \times \text{app\_cos}(\tilde{\phi} \times q_\phi))$$

$$\hat{y} = \text{round}(\tilde{r} \times q_r \times \text{app\_sin}(\tilde{\phi} \times q_\phi))$$

$$\hat{z} = \text{round}(\tilde{r} \times q_r \times \tilde{t}(i) \times q_\theta - \tilde{z}(i) \times q_\varsigma),$$

where app_cos(.) and app_sin(.) are approximations of cos (.) and sin(.). The calculations could be performed using a fixed-point representation, a look-up table, and/or linear interpolation.

Note that (x̂, ŷ, ẑ) may be different from (x, y, z) due to various reasons, such as quantization, approximations, model imprecision, model parameters imprecisions, or the like.

$(r_x, r_y, r_z)$ can be the reconstruction residuals defined as follows:

$$r_x = x - \hat{x}$$

$$r_y = y - \hat{y}$$

$$r_z = z - \hat{z}$$

With this technique, G-PCC encoder 200 may proceed as follows:

1) Encode the model parameters t̃(i) and z̃(i) and the quantization parameters $q_r$ $q_ç$, $q_\theta$ and $q_\phi$
2) Apply the geometry predictive scheme described in the text of ISO/IEC FDIS 23090-9 Geometry-based Point Cloud Compression, ISO/IEC JTC 1/SC29/WG 7 m55637, Teleconference, Oct. 2020, to the representation (r̃, ϕ̃, i).
   A new predictor leveraging the characteristics of LIDAR may be introduced. For instance, the rotation speed of the LIDAR scanner around the z-axis is usually constant. Therefore, G-PCC encoder 200 could predict the current ϕ̃(j) as follows:

$$\tilde{\phi}(j) = \tilde{\phi}(j-1) + n(j) \times \delta_\phi(k)$$

Where
   $(\delta_\phi((k))_{k=1 \ldots K}$ is a set of potential speeds G-PCC encoder 200 may use. The index k may be explicitly written to a bitstream or may be inferred from the context based on a deterministic strategy applied by both G-PCC encoder 200 and G-PCC decoder 300, and n(j) is the number of skipped points which may be explicitly written to the bitstream or may be inferred from the context based on a deterministic strategy applied by both G-PCC encoder 200 and G-PCC decoder 300. n(j) is also referred to as a "phi multiplier" herein. Note, the phi multiplier is currently used only with the delta predictor.
3) Encode with each node the reconstruction residuals $(r_x, r_y, r_z)$ G-PCC decoder 300 may proceed as follows:

1) Decode the model parameters t̃(i) and z̃(i) and the quantization parameters $q_r$ $q_ç$, $q_\theta$ and $q_\phi$
2) Decode the (r̃, ϕ̃, i) parameters associated with the nodes according to the geometry predictive scheme described in the text of ISO/IEC FDIS 23090-9 Geometry-based Point Cloud Compression, ISO/IEC JTC 1/SC29/WG 7 m55637, Teleconference, Oct. 2020.

3) Compute the reconstructed coordinates ($\hat{x}$, $\hat{y}$, $\hat{z}$) as described above 4) Decode the residuals ($r_x$, $r_y$, $r_z$)

As discussed in the next section, lossy compression could be supported by quantizing the reconstruction residuals ($r_x$, $r_y$, $r_z$)

5) Compute the original coordinates (x, y, z) as follows $$x = r_x + \hat{x}$$

$$y = r_y + \hat{y}$$

$$z = r_z + \hat{z}$$

Lossy compression may be achieved by applying quantization to the reconstruction residuals ($r_x$, $r_y$, $r_z$) or by dropping points.

The quantized reconstruction residuals may be computed as follows:

$$\tilde{r}_x = \text{sign}(r_x) \times \text{floor}\left(\frac{|r_x|}{q_x} + o_x\right)$$

$$\tilde{r}_y = \text{sign}(r_y) \times \text{floor}\left(\frac{|r_y|}{q_y} + o_y\right)$$

$$\tilde{r}_z = \text{sign}(r_z) \times \text{floor}\left(\frac{|r_z|}{q_z} + o_z\right)$$

Where ($q_x$, $o_x$), ($q_y$, $o_y$)and ($q_z$, $o_z$) are quantization parameters controlling the precision of $\tilde{r}_x$, $\tilde{r}_y$ and $\tilde{r}_z$, respectively. For example, G-PCC encoder 200 or G-PCC decoder 300 may compute the quantized residuals.

G-PCC encoder 200 or G-PCC decoder 300 may use trellis quantization to further improve the RD (rate-distortion) performance results.

The quantization parameters may change at sequence/frame/slice/block level to achieve region adaptive quality and/or for rate control purposes.

Inter prediction in G-PCC predictive geometry coding is now discussed. Information regarding G-PCC predictive geometry coding may be found in Technologies under consideration in G-PCC, ISO/IEC JTC 1/SC29/WG 7 MDS21256, Teleconference, October 2021; in A. K. Ramasubramonian, B. Ray, L. Pham Van, G. Van der Auwera, M. Karczewicz, [G-PCC][New] Inter prediction with predictive geometry coding, ISO/IEC JTC1/SC29/WG7 m56117, January 2021; and in A. K. Ramasubramonian, L. Pham Van, G. Van der Auwera, M. Karczewicz, [G-PCC] EE13.2 report on inter prediction, Test 2, ISO/IEC JTC1/SC29/WG7 m56839, April 2021.

Predictive geometry coding uses a prediction tree structure to predict the positions of points. When angular coding is enabled, the x, y, z coordinates are transformed to radius, azimuth and laserID and residuals may be signaled in these three coordinates as well as in the x, y, z dimensions. The intra prediction used for radius, azimuth and laserID may be one of four modes and the predictors are nodes that are classified as parent, grand-parent, and great-grandparent in the prediction tree with respect to the current node. The predictive geometry coding, as designed in G-PCC Ed.1, is an intra coding tool as it only uses points in the same frame for prediction. Additionally, using points from previously decoded frames may provide a better prediction and thus better compression performance.

For inter prediction, as initially proposed in Technologies under consideration in G-PCC, ISO/IEC JTC 1/SC29/WG 7 MDS20999, Teleconference, October 2021; and A. K. Ramasubramonian, L. Pham Van, G. Van der Auwera, M. Karczewicz, [G-PCC] EE13.2 report on inter prediction, Test 2, ISO/IEC JTC1/SC29/WG7 m56839, April 2021, the proposal was to predict the radius of a point from a reference frame. For each point in the prediction tree, G-PCC decoder 300 may determine whether the point is inter predicted or intra predicted (e.g., G-PCC encoder 200 may indicate such inter prediction or intra prediction by a flag which G-PCC encoder 200 may signal in the bitstream). When intra predicted, the intra prediction modes of predictive geometry coding are used. When inter-prediction is used, the azimuth and laserID are still predicted with intra prediction, while the radius is predicted from the point in the reference frame that has the same laserID as the current point and an azimuth that is closest to the current azimuth. A further change to this technique in A. K. Ramasubramonian, G. Van der Auwera, L. Pham Van, M. Karczewicz, [G-PCC][EE13.2-related] Additional results for inter prediction for predictive geometry, ISO/IEC JTC1/SC29/WG7 m56841, April 2021, also enables inter prediction of the azimuth and laserID in addition to radius prediction. When inter-coding is applied, the radius, azimuth and laserID of the current point are predicted based on a point that is near the azimuth position of a previously decoded point in the reference frame. In addition, separate sets of contexts are used for inter and intra prediction.

Figure 7:
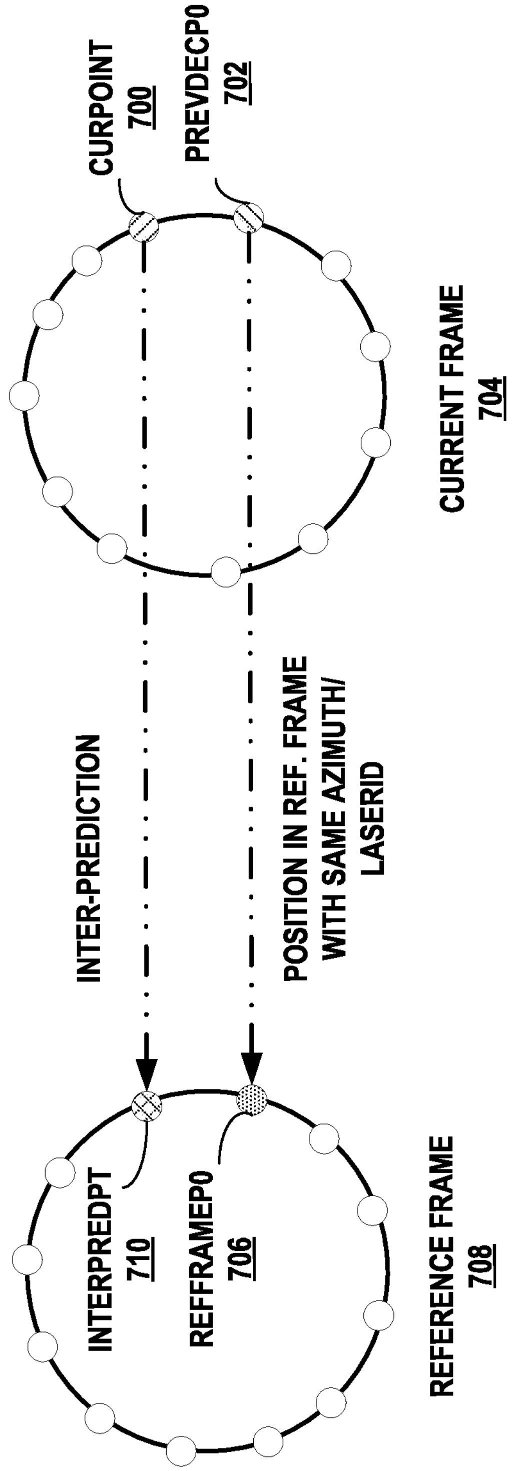
FIG. 7 is a conceptual diagram illustrating an example of inter-prediction of a current point from a point in a reference frame, in accordance with one or more techniques of this disclosure.

FIG. 7 is a conceptual diagram illustrating an example of inter-prediction of a current point from a point in a reference frame. This concept may be available in A. K. Ramasubramonian, G. Van der Auwera, L. Pham Van, M. Karczewicz, [G-PCC][EE13.2-related] Additional results for inter prediction for predictive geometry, ISO/IEC JTC1/SC29/WG7 m56841, April 2021. The extension of inter prediction to azimuth, radius, and laserID includes the following steps which, for example, may be performed by G-PCC decoder 300:

1) For a given point (e.g., the current point curPoint 700 in current frame 704), choose the previous decoded point (prevDecPO 702).

2) Choose a position (e.g., refFramePO 706) in reference frame 70 that has same scaled azimuth and laserID as prevDecPO 702.

3) In reference frame 708, find the first point (interPredPt 710) that has azimuth greater than that of refFramePO 706. The interPredPt may also be referred to as the "Next" inter predictor.

Figure 8:
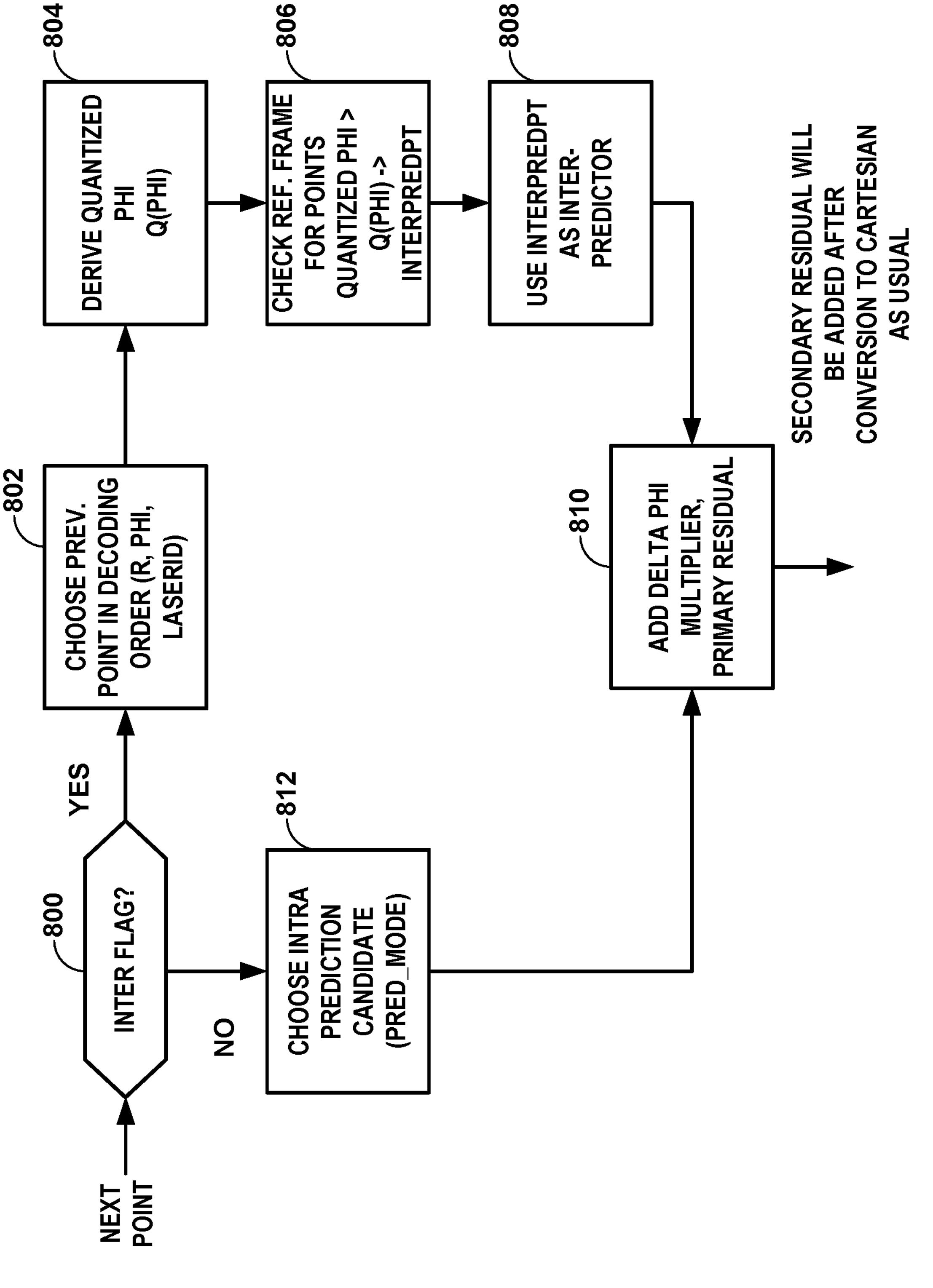
FIG. 8 is a flow diagram illustrating operation of a G-PCC decoder, in accordance with one or more techniques of this disclosure.

FIG. 8 is a flow diagram illustrating operation of a G-PCC decoder. FIG. 8 illustrates the decoding flow associated with the "inter_flag" that is signaled for every point. The technique is available in InterEM-v3.0.

For example, G-PCC decoder 300 may determine whether the inter flag is true (e.g., equal to 1) (800). If the inter flag is true (the "YES" path from block 800), G-PCC decoder 300 may choose a previous decoded point in decoding order using radius, azimuth, and laserID (802). G-PCC decoder 300 may derive a quantized phi, Q(phi) (e.g., a quantized value of the azimuth) of the chosen previous decoded point (e.g., prevDecPO 702) (804). G-PCC decoder 300 may check the reference frame (e.g., reference frame 708 of FIG. 7) for points where the quantized phi of such points is greater than Q(phi) which may lead to interPredPt 710 (806). G-PCC decoder 300 may then use interPredPt 710 as an inter-predictor for the current point, curPoint 700 (808). G-PCC decoder 300 may then add a delta phi multiplier, e.g., $n(j)\times\delta_{\phi}(k)$ as discussed above, to the primary residual (810).

If the inter flag is false (e.g., is equal to 0) (the "NO" path from block 800), G-PCC decoder 300 may choose an intra prediction candidate (812) and apply intra prediction. G-PCC decoder 300 may then add a delta phi multiplier to yield the primary residual (810).

Figure 9:
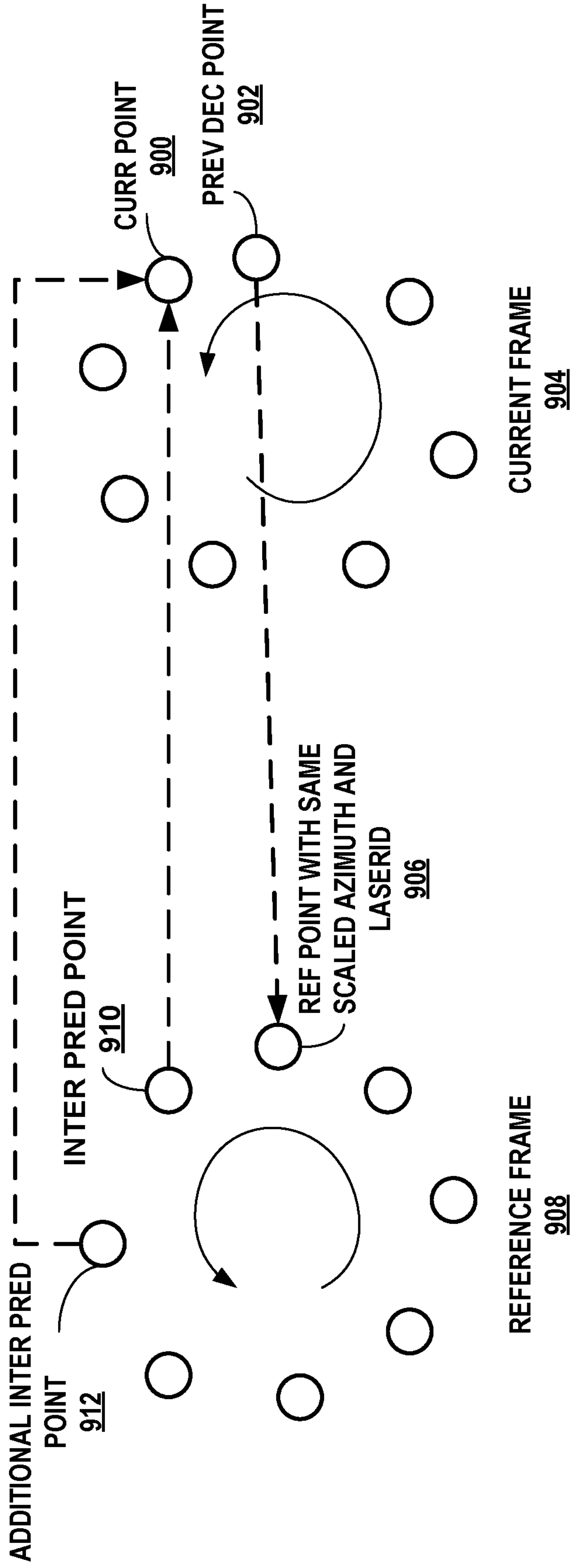
FIG. 9 is a conceptual diagram illustrating an example of an additional inter predictor point obtained from the first point that has an azimuth greater than the inter predictor point, in accordance with one or more techniques of this disclosure.

FIG. 9 is a conceptual diagram illustrating an example of an additional inter predictor point obtained from the first point that has an azimuth greater than the inter predictor point. An additional predictor candidate is now discussed. Information relating to the additional predictor candidate may be found in K. L. Loi, T. Nishi, T. Sugio, [G-PCC] [New] Inter Prediction for Improved Quantization of Azimuthal Angle in Predictive Geometry Coding, ISO/IEC JTC1/SC29/WG7 m57351, July 2021. In the inter prediction technique for predictive geometry described above, the radius, azimuth and laserID of the current point are predicted based on a point that is near the collocated azimuth position in the reference frame when inter coding is applied, for example, by G-PCC decoder 300, using the following steps:

1) for a given point (e.g., a current point, Curr Point 900), choose the previous decoded point (e.g., Prev Dec Point 902),
2) choose a position (e.g., Ref Point 906) in reference frame 908 that has the same scaled azimuth and laserID as the previous decoded point (e.g., Prev Dec Point 902),
3) choose a position (Inter Pred Point 910) in reference frame 908 from the first point that has azimuth greater than the position in reference frame 908 that has the same scaled azimuth and laserID as the previous decoded point (e.g., Prev Dec Point 902), to be used as the inter predictor point.

This technique adds an additional inter predictor point 912 that is obtained by finding the first point that has an azimuth greater than the inter predictor point (e.g., Inter Pred Point 910) as shown in FIG. 9. Additional signaling is used to indicate which of the predictors is selected if inter coding has been applied by G-PCC encoder 200. For example, G-PCC encoder 200 may signal to G-PCC decoder 300 which of the predictors is selected. The additional inter predictor point may also be referred to as the "NextNext" inter predictor.

Improved inter prediction flag coding is now discussed. Information regarding improved inter prediction flag coding may be found in A. K. Ramasubramonian, L. Pham Van, G. Van der Auwera, M. Karczewicz, [G-PCC][New proposal] Improvements to inter prediction using predictive geometry coding, ISO/IEC JTC1/SC29/WG7 m57299, July 2021. An improved context selection algorithm may be applied for coding the inter prediction flag. G-PCC encoder 200 may use the inter prediction flag values of the five previously coded points to select the context of the inter prediction flag in predictive geometry coding.

A reference frame used for inter prediction is now described. Information regarding the reference frame used for inter prediction may be found in K. L. Loi, T. Nishi, T. Sugio, [G-PCC][EE13.2] Report on inter prediction Test 8 for predictive geometry, ISO/IEC JTC1/SC29/WG7 m61586, January 2023; and in A. K. Ramasubramonian, G. Van der Auwera, M. Karczewicz, Thoughts on EE13.2 Test 8—inter prediction in predictive geometry coding, ISO/IEC JTC1/SC29/WG7 m62218, January 2023.

The following names which may be used in this disclosure may be defined as set forth below:

Prev—refers to the reference frame used for inter prediction when only one reference frame is used; when more than one reference frame is used, prev may indicate the reference frame that is closer to the current frame in output order (e.g., frame distance).

X-Zero—uncompensated reference frame X; also referred as X.

X-Glob—reference frame X after global motion compensation.

X-Resam—resampled reference frame X, which may be obtained from X-Glob and X-Zero.

PrevPrev—refers to the reference frame of the previous reference frame (previous previous reference frame).

X/Next—refers to the Next inter prediction candidate from reference frame X.

X/NextNext—refers to the NextNext inter prediction candidate from reference frame X.

For predictive geometry, the reference frame selection and thus the inter prediction candidates may be chosen as follows:

When global motion is disabled:

If resampling is enabled, the resampled reference frame Prev-Resam may be chosen. The inter prediction list may be as follows:

Prev-Resam/Next
Prev-Resam/NextNext

If resampling is disabled, the uncompensated reference frame Prev-Zero may be chosen. The inter prediction list may be as follows:

Prev-Zero/Next
Prev-Zero/NextNext

When global motion is enabled:

If resampling is enabled, the resampled reference frame Prev-Resam may be chosen. The inter prediction list may be as follows:

Prev-Resam/Next,
Prev-Resam/NextNext
Prev-Glob/Next
Prev-Glob/NextNext

If resampling is disabled, the uncompensated reference frame Prev-Zero may be chosen. The inter prediction list may be as follows:

Prev-Zero/Next
Prev-Zero/NextNext
Prev-Glob/Next
Prev-Glob/NextNext

In K. L. Loi, T. Nishi, T. Sugio, [G-PCC][EE13.2] Report on inter prediction Test 8 for predictive geometry, ISO/IEC JTC1/SC29/WG7 m61586, January 2023, it is further proposed to check a movingState of the point cloud frame; if the point cloud frame is "moving", e.g., there is considerable motion between the reference frame and current frame, the global motion compensated candidate may be used as above; otherwise, it may be considered a static state, and the PrevPrev reference frame may be used in place of global motion compensated candidate. In the bitstream, effectively, a flag gmForCurrFrame may be used to indicate whether global motion is applied for a particular frame.

When global motion is disabled:

If resampling is enabled, the resampled reference frame Prev-Resam may be chosen. The inter prediction list may be as follows:

Prev-Resam/Next
Prev-Resam/NextNext

If resampling is disabled, the uncompensated reference frame Prev-Zero may be chosen. The inter prediction list may be as follows:

Prev-Zero/Next

Prev-Zero/NextNext

When global motion is enabled:

If resampling is enabled, the resampled reference frame Prev-Resam may be chosen. The inter prediction list may be as follows:

Prev-Resam/Next,

Prev-Resam/NextNext

Prev-Glob/Next if gmFrameCurrFrame=1, else PrevPrev/Next

Prev-Glob/NextNext if gmFrameCurrFrame=1, else PrevPrev/NextNext

If resampling is disabled, the uncompensated reference frame Prev-Zero may be chosen. The inter prediction list may be as follows:

Prev-Zero/Next

Prev-Zero/NextNext

Prev-Glob/Next if gmFrameCurrFrame=1, else PrevPrev/Next

Prev-Glob/NextNext if gmFrameCurrFrame=1, else PrevPrev/NextNext

The selection of reference frames as discussed above is limited to choosing between PrevPrev and Prev-Glob. Such techniques do not allow the use of a global motion compensated PrevPrev frame or the use of a resampled previous reference frame. However, in some cases a global motion compensated PrevPrev frame or a resampled previous reference frame may provide for better prediction and therefore a better quality reconstruction of the point cloud by G-PCC decoder 300 and/or fewer bits used to transmit residuals from G-PCC encoder 200 to G-PCC decoder 300.

In some examples, a syntax element may be signaled to indicate whether the PrevPrev frame may be used for inter prediction. For example, G-PCC encoder 200 may signal a flag, such as usePrevPrevRefFrameFlag, to indicate whether the previous previous reference frame is used. G-PCC decoder 300 may parse such a flag to determine whether the previous previous reference frame is used. When the syntax element takes one value (e.g., 1) the PrevPrev frame may be used for inter prediction; when the syntax element takes a second value (e.g., 0), the PrevPrev frame is not used for inter prediction.

When the PrevPrev frame may be used for inter prediction:

if resampling is not applied, the global motion parameters signalled with the current frame may apply to the PrevPrev frame. If resampling is applied, a second set of global motion parameters may be signalled with the current frame which apply to the PrevPrev frame. For example, G-PCC encoder 200 may signal the global motion parameters and/or the second set of global motion parameters to G-PCC decoder 300 in a bitstream. It should be understood that when resampling is enabled for coding the current frame (in which case resampling may be applied for the current frame), the reference frame may be compensated and resampled. However, G-PCC decoder 300 may determine that resampling is applied for the current frame while processing the current frame.

In one example, resampling is only enabled when global motion is enabled. When resampling is disabled, the uncompensated reference frame may be used in place of the resampled reference frame. For example, G-PCC encoder 200 or G-PCC decoder 300 may use the uncompensated reference frame rather than the resampled reference frame when resampling is disabled.

In one example, the NextNext candidate is not selected for some reference frames; instead the Next candidate from another reference frame is selected. For example, G-PCC encoder 200 or G-PCC decoder 300 may select a Next candidate from another reference frame for inter prediction, rather than the NextNext candidate.

In some examples, when global motion is enabled (for the overall point cloud sequence), a flag may be signalled at a frame/slice level to indicate whether global motion compensation is to be applied to a current frame. For example, G-PCC encoder 200 may signal the flag to G-PCC decoder 300. In such cases, when global motion compensation is not to be applied to a current frame, the last two entries in the inter predictor candidate list may be disallowed.

In another example, when global motion compensation is not to be applied to a current frame, the last two entries in the inter predictor candidate list may be disallowed only when the previous previous frame is not used for inter prediction. For example, if the PrevPrev frame is not used for inter prediction, and global motion compensation is not applied to the current frame, G-PCC encoder 200 or G-PCC decoder 300 may not use the last two entries in the inter predictor candidate list.

In some cases, when global motion is enabled (overall), but global motion is not applied to the current frame, the inter prediction list may be derived similar to the case where global motion is disabled (overall).

In a first example, G-PCC encoder 200 or G-PCC decoder 300 may use the following for choosing a reference frame for inter prediction and the inter prediction list candidates:

In this first example, when global motion is disabled:

If resampling is enabled, the resampled reference frame Prev-Resam is chosen. The inter prediction list is as follows:

Prev-Resam/Next

Prev-Resam/NextNext

PrevPrev/Next if usePrevPrevRefFrameFlag=1, else None

PrevPrev/NextNext if usePrevPrevRefFrameFlag=1, else None

If resampling is disabled, the uncompensated reference frame Prev-Zero is chosen. The inter prediction list is as follows:

Prev-Zero/Next

Prev-Zero/NextNext

PrevPrev/Next if usePrevPrevRefFrameFlag=1, else None

PrevPrev/NextNext if usePrevPrevRefFrameFlag=1, else None

In this first example, when global motion is enabled:

X is selected as PrevPrev when usePrevPrevRefFrameFlag=1, else Prev

Y is selected as PrevPrev when usePrevPrevRefFrameFlag=1, else None

If resampling is enabled, the resampled reference frame Prev-Resam is chosen. The inter prediction list is as follows:

Prev-Resam/Next,

Prev-Resam/NextNext

X-Glob/Next if gmFrameCurrFrame=1, else Y/Next

X-Glob/NextNext if gmFrameCurrFrame=1, else Y/NextNext

If resampling is disabled, the uncompensated reference frame Prev-Zero is chosen. The inter prediction list is as follows:

Prev-Zero/Next
Prev-Zero/NextNext
X-Glob/Next if gmFrameCurrFrame=1, else Y/Next
X-Glob/NextNext if gmFrameCurrFrame=1, else Y/NextNext In another example, G-PCC encoder 200 or G-PCC decoder 300 may use the following for choosing a reference frame for inter prediction and the inter prediction list candidates. In this second example, when the PrevPrev frame is used, it is used in place of Prev for the third and fourth candidates in the list.

In this second example, when global motion is disabled:

If resampling is enabled, the resampled reference frame Prev-Resam is chosen. The inter prediction list is as follows:

Prev-Resam/Next
Prev-Resam/NextNext
PrevPrev-Resam/Next if usePrevPrevRefFrameFlag=1, else None
PrevPrev-Resam/NextNext if usePrevPrevRefFrameFlag=1, else None If resampling is disabled, the uncompensated reference frame Prev-Zero is chosen. The inter prediction list is as follows:

Prev-Zero/Next
Prev-Zero/NextNext
PrevPrev/Next if usePrevPrevRefFrameFlag=1, else None
PrevPrev/NextNext if usePrevPrevRefFrameFlag=1, else None In this second example, when global motion is enabled:

If resampling is enabled, the resampled reference frame Prev-Resam is chosen. The inter prediction list is as follows:

Prev-Resam/Next
Prev-Resam/NextNext
PrevPrev-Resam/Next if usePrevPrevRefFrameFlag=1, else None
PrevPrev-Resam/NextNext if usePrevPrevRefFrameFlag=1, else None If resampling is disabled, the uncompensated reference frame Prev-Zero is chosen. The inter prediction list is as follows:

Prev-Zero/Next
Prev-Zero/NextNext
PrevPrev/Next if usePrevPrevRefFrameFlag=1, else None
PrevPrev/NextNext if usePrevPrevRefFrameFlag=1, else None Examples in the various aspects of this disclosure may be used individually or in any combination.

FIG. 10 is a flow diagram illustrating example inter prediction candidate selection techniques according to one or more aspects of this disclosure. G-PCC encoder 200 or G-PCC decoder 300 may process a syntax element indicative of whether a previous previous frame can be used for inter prediction for one or more points of the point cloud data, wherein the previous previous frame comprises a reference frame of a previous reference frame (1000). For example, G-PCC encoder 200 may determine whether a previous previous frame can be used for inter prediction for one or more points and encode and signal a syntax element indicative of whether a previous previous frame can be used for inter prediction for the one or more points. G-PCC decoder 300 may receive the syntax element in a bitstream and parse the syntax element to determine the value of the syntax element. The value of the syntax element may be indicative of whether a previous previous frame can be used for inter prediction for the one or more points.

G-PCC encoder 200 or G-PCC decoder 300 may code the one or more points based on a determination of whether the previous previous frame can be used for inter prediction for the one or more points (1002). For example, G-PCC encoder 200 may encode the one or more points based on whether the previous previous frame can be used for inter prediction for the one or more points and G-PCC decoder 300 may decode the one or more points based on whether the previous previous frame can be used for inter prediction for the one or more points. For example, if the previous previous frame can be used for inter prediction for the one or more points, G-PCC encoder 200 and G-PCC decoder 300 may code the point cloud data using the previous previous frame for inter prediction for the one or more points. If the previous previous frame cannot be used for inter prediction, G-PCC encoder 200 and G-PCC decoder 300 may code the point cloud data without using the previous previous frame for inter prediction for the one or more points.

In some examples, the previous previous frame can be used for inter prediction. In some examples, G-PCC encoder 200 or G-PCC decoder 300 may determine that resampling is not applied to a current frame of the point cloud data. In such examples, G-PCC encoder 200 or G-PCC decoder 300 may apply, to the previous previous frame, a first set of one or more global motion parameters signaled with the current frame.

In some examples, the previous previous frame can be used for inter prediction. In some examples, G-PCC encoder 200 or G-PCC decoder 300 may determine that resampling is applied to a current frame of the point cloud data. In such examples, G-PCC encoder 200 or G-PCC decoder 300 may process (e.g., signal or parse) a second set of one or more global motion parameters and apply the second set of one or more global motion parameters to the previous previous frame. In some examples, G-PCC encoder 200 or G-PCC decoder 300 may also process (e.g., signal or parse) a first set of global motion parameters and apply the first set of global motion parameters to the previous frame.

In some examples, G-PCC encoder 200 or G-PCC decoder 300 may determine that global motion is not enabled. In some examples, G-PCC encoder 200 or G-PCC decoder 300 may, based on global motion not being enabled, disabling resampling. In some examples, G-PCC encoder 200 or G-PCC decoder 300 may use an uncompensated reference frame rather than a resampled reference frame.

In some examples, G-PCC encoder 200 or G-PCC decoder 300 may use a next candidate from a reference frame in place of a next next candidate, the next next candidate being a candidate after a first candidate and a second candidate in a inter predictor candidate list.

In some examples, G-PCC encoder 200 or G-PCC decoder 300 may determine that global motion compensation is enabled and process a flag at a frame level or a slice level indicative of whether global motion compensation is to be applied to a current frame of the point cloud data. In some examples, global motion compensation is not to be applied to the current frame. In such examples, G-PCC encoder 200 or G-PCC decoder 300 may disallow a last two entries of an inter predictor candidate list. In some examples, G-PCC encoder 200 or G-PCC decoder 300 may determine that the previous previous frame is not used for inter prediction and disallowing the last two entries of the inter predictor candidate list is based on the previous previous frame not being used for inter prediction.

In some examples, G-PCC encoder 200 or G-PCC decoder 300 may determine that global motion compensation is disabled. In some examples, G-PCC encoder 200 or G-PCC decoder 300 may determine that resampling is enabled. In some examples, G-PCC encoder 200 or G-PCC decoder 300 may, based on global motion compensation being disabled and resampling being enabled, select a previous resampled reference frame as the reference frame for inter prediction.

In some examples, G-PCC encoder 200 or G-PCC decoder 300 may determine that global motion compensation is disabled. In some examples, G-PCC encoder 200 or G-PCC decoder 300 may determine that resampling is disabled. In some examples, G-PCC encoder 200 or G-PCC decoder 300 may, based on global motion compensation being disabled and resampling being disabled, selecting a previous unresampled reference frame as the reference frame for inter prediction.

In some examples, G-PCC encoder 200 or G-PCC decoder 300 may determine that global motion compensation is enabled. In some examples, G-PCC encoder 200 or G-PCC decoder 300 may determine that resampling is enabled. In some examples, G-PCC encoder 200 or G-PCC decoder 300 may, based on global motion compensation being enabled and resampling being enabled, select a previous resampled reference frame as the reference frame for inter prediction.

In some examples, code includes decode and process the syntax element includes parse the syntax element to determine a value of the syntax element indicative of whether the previous previous frame can be used for inter prediction. In some examples, code includes encode and process the syntax element includes encode the syntax element to include a value indicative of whether the previous previous frame can be used for inter prediction.

Figure 11:
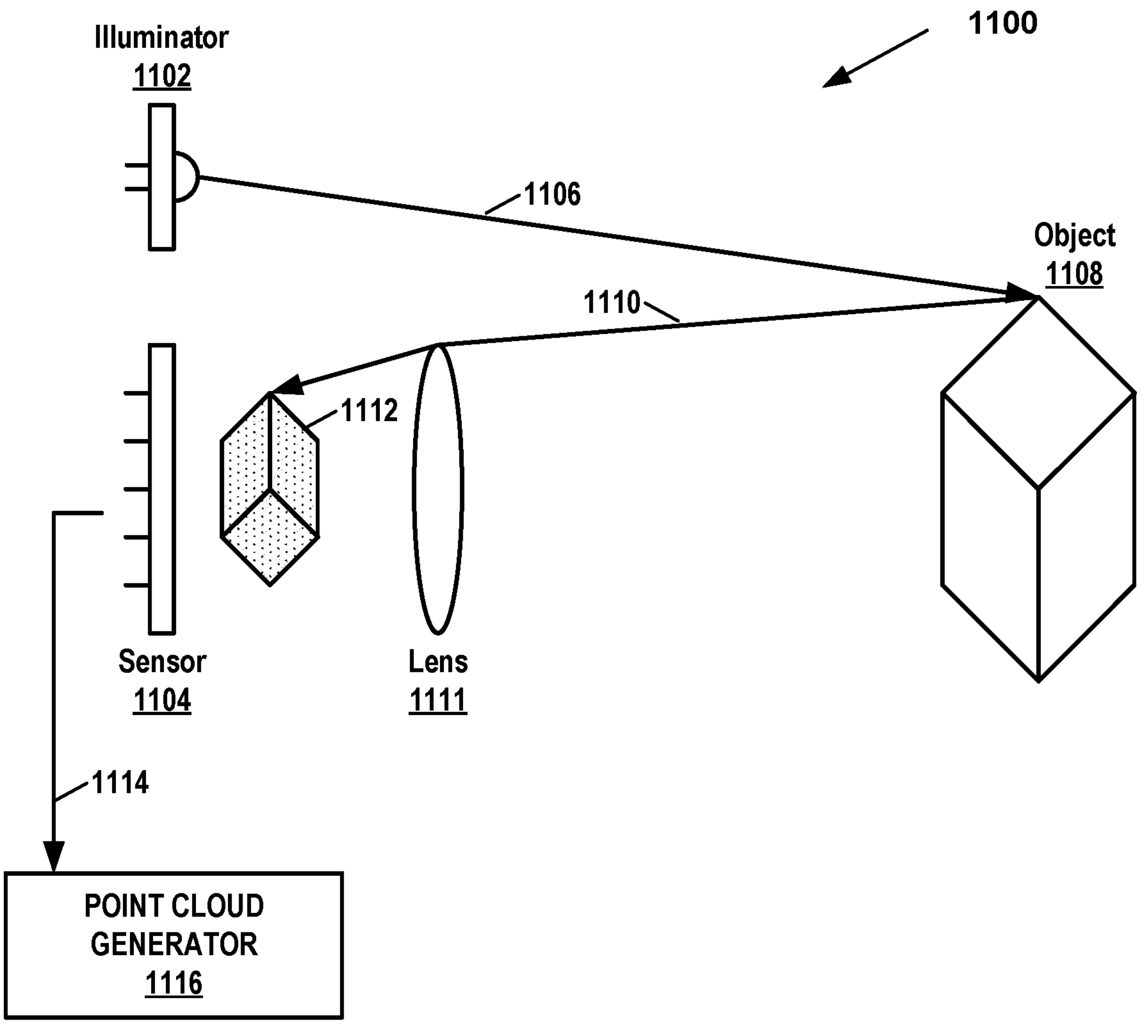
FIG. 11 is a conceptual diagram illustrating an example range-finding system that may be used with one or more techniques of this disclosure.

FIG. 11 is a conceptual diagram illustrating an example range-finding system 1100 that may be used with one or more techniques of this disclosure. In the example of FIG. 11, range-finding system 1100 includes an illuminator 1102 and a sensor 1104. Illuminator 1102 may emit light 1106. In some examples, illuminator 1102 may emit light 1106 as one or more laser beams. Light 1106 may be in one or more wavelengths, such as an infrared wavelength or a visible light wavelength. In other examples, light 1106 is not coherent, laser light. When light 1106 encounters an object, such as object 1108, light 1106 creates returning light 1110. Returning light 1110 may include backscattered and/or reflected light. Returning light 1110 may pass through a lens 1111 that directs returning light 1110 to create an image 1112 of object 1108 on sensor 1104. Sensor 1104 generates signals 1114 based on image 1112. Image 1112 may comprise a set of points (e.g., as represented by dots in image 1112 of FIG. 11).

In some examples, illuminator 1102 and sensor 1104 may be mounted on a spinning structure so that illuminator 1102 and sensor 1104 capture a 360-degree view of an environment (e.g., a spinning LIDAR sensor). In other examples, range-finding system 1100 may include one or more optical components (e.g., mirrors, collimators, diffraction gratings, etc.) that enable illuminator 1102 and sensor 1104 to detect ranges of objects within a specific range (e.g., up to 360-degrees). Although the example of FIG. 11 only shows a single illuminator 1102 and sensor 1104, range-finding system 1100 may include multiple sets of illuminators and sensors.

In some examples, illuminator 1102 generates a structured light pattern. In such examples, range-finding system 1100 may include multiple sensors 1104 upon which respective images of the structured light pattern are formed. Range-finding system 1100 may use disparities between the images of the structured light pattern to determine a distance to an object 1108 from which the structured light pattern backscatters. Structured light-based range-finding systems may have a high level of accuracy (e.g., accuracy in the sub-millimeter range), when object 1108 is relatively close to sensor 1104 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 1100 is a time of flight (ToF)-based system. In some examples where range-finding system 1100 is a ToF-based system, illuminator 1102 generates pulses of light. In other words, illuminator 1102 may modulate the amplitude of emitted light 1106. In such examples, sensor 1104 detects returning light 1110 from the pulses of light 1106 generated by illuminator 1102. Range-finding system 1100 may then determine a distance to object 1108 from which light 1106 backscatters based on a delay between when light 1106 was emitted and detected and the known speed of light in air). In some examples, rather than (or in addition to) modulating the amplitude of the emitted light 1106, illuminator 1102 may modulate the phase of the emitted light 1106. In such examples, sensor 1104 may detect the phase of returning light 1110 from object 1108 and determine distances to points on object 1108 using the speed of light and based on time differences between when illuminator 1102 generated light 1106 at a specific phase and when sensor 1104 detected returning light 1110 at the specific phase.

In other examples, a point cloud may be generated without using illuminator 1102. For instance, in some examples, sensors 1104 of range-finding system 1100 may include two or more optical cameras. In such examples, range-finding system 1100 may use the optical cameras to capture stereo images of the environment, including object 1108. Range-finding system 1100 may include a point cloud generator 1116 that may calculate the disparities between locations in the stereo images. Range-finding system 1100 may then use the disparities to determine distances to the locations shown in the stereo images. From these distances, point cloud generator 1116 may generate a point cloud.

Sensors 1104 may also detect other attributes of object 1108, such as color and reflectance information. In the example of FIG. 11, a point cloud generator 1116 may generate a point cloud based on signals 1114 generated by sensor 1104. Range-finding system 1100 and/or point cloud generator 1116 may form part of data source 104 (FIG. 1). Hence, a point cloud generated by range-finding system 1100 may be encoded and/or decoded according to any of the techniques of this disclosure.

Figure 12:
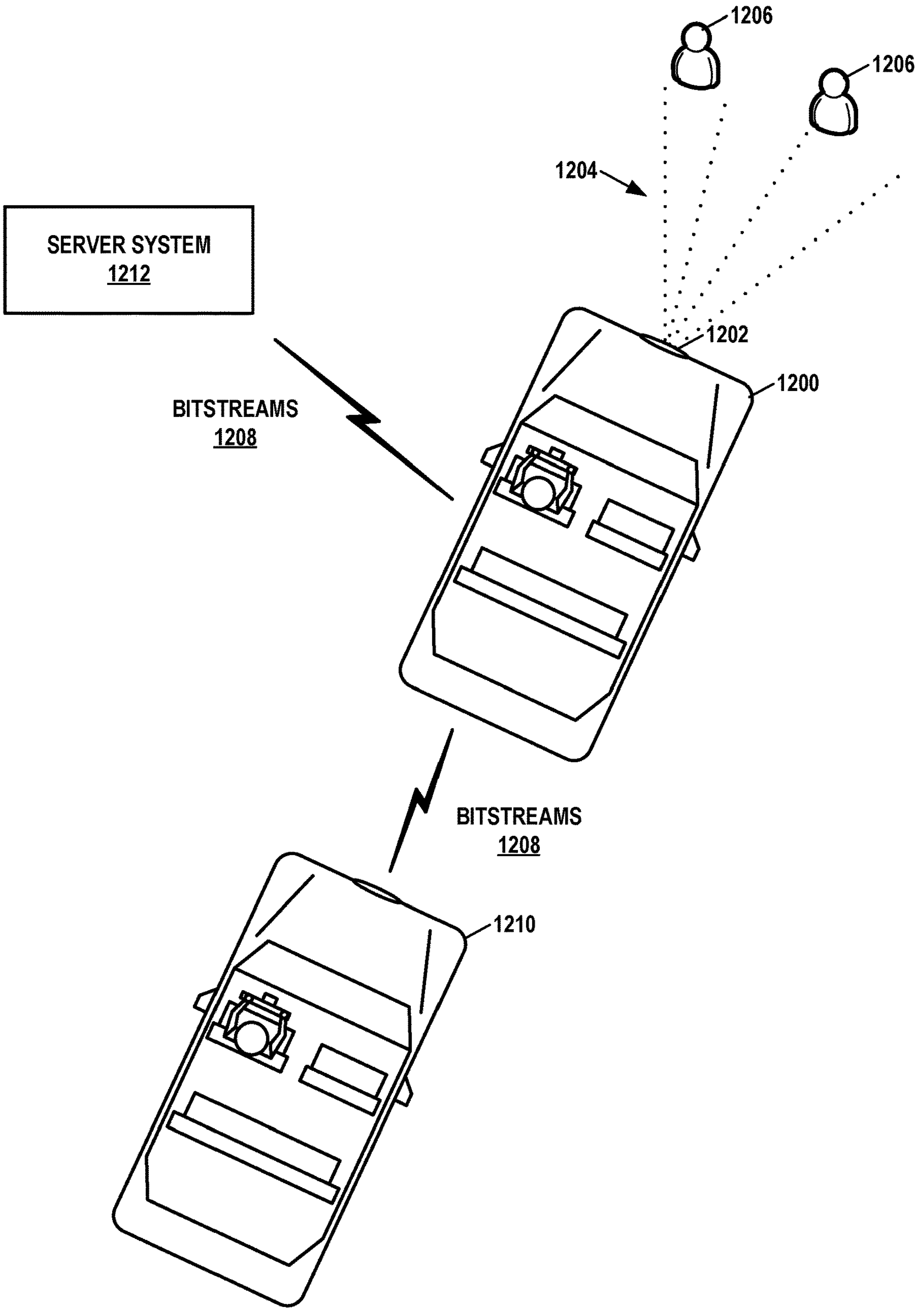
FIG. 12 is a conceptual diagram illustrating an example vehicle-based scenario in which one or more techniques of this disclosure may be used.

FIG. 12 is a conceptual diagram illustrating an example vehicle-based scenario in which one or more techniques of this disclosure may be used. In the example of FIG. 12, a vehicle 1200 includes a range-finding system 1202. Range-finding system 1202 may be implemented in the manner discussed with respect to FIG. 11. Although not shown in the example of FIG. 12, vehicle 1200 may also include a data source, such as data source 104 (FIG. 1), and a G-PCC encoder, such as G-PCC encoder 200 (FIG. 1). In the example of FIG. 12, range-finding system 1202 emits laser beams 1204 that reflect off pedestrians 1206 or other objects in a roadway. The data source of vehicle 1200 may generate a point cloud based on signals generated by range-finding system 1202. The G-PCC encoder of vehicle 1200 may encode the point cloud to generate bitstreams 1208, such as geometry bitstream (FIG. 2) and attribute bitstream (FIG. 2). Inter prediction and residual prediction, as described in this disclosure may reduce the size of the geometry bitstream. Bitstreams 1208 may include many fewer bits than the unencoded point cloud obtained by the G-PCC encoder.

An output interface of vehicle 1200 (e.g., output interface 108 (FIG. 1) may transmit bitstreams 1208 to one or more other devices. Bitstreams 1208 may include many fewer bits than the unencoded point cloud obtained by the G-PCC encoder. Thus, vehicle 1200 may be able to transmit bitstreams 1208 to other devices more quickly than the unencoded point cloud data. Additionally, bitstreams 1208 may require less data storage capacity on a device.

In the example of FIG. 12, vehicle 1200 may transmit bitstreams 1208 to another vehicle 1210. Vehicle 1210 may include a G-PCC decoder, such as G-PCC decoder 300 (FIG. 1). The G-PCC decoder of vehicle 1210 may decode bitstreams 1208 to reconstruct the point cloud. Vehicle 1210 may use the reconstructed point cloud for various purposes. For instance, vehicle 1210 may determine based on the reconstructed point cloud that pedestrians 1206 are in the roadway ahead of vehicle 1200 and therefore start slowing down, e.g., even before a driver of vehicle 1210 realizes that pedestrians 1206 are in the roadway. Thus, in some examples, vehicle 1210 may perform an autonomous navigation operation based on the reconstructed point cloud.

Additionally or alternatively, vehicle 1200 may transmit bitstreams 1208 to a server system 1212. Server system 1212 may use bitstreams 1208 for various purposes. For example, server system 1212 may store bitstreams 1208 for subsequent reconstruction of the point clouds. In this example, server system 1212 may use the point clouds along with other data (e.g., vehicle telemetry data generated by vehicle 1200) to train an autonomous driving system. In other example, server system 1212 may store bitstreams 1208 for subsequent reconstruction for forensic crash investigations.

Figure 13:
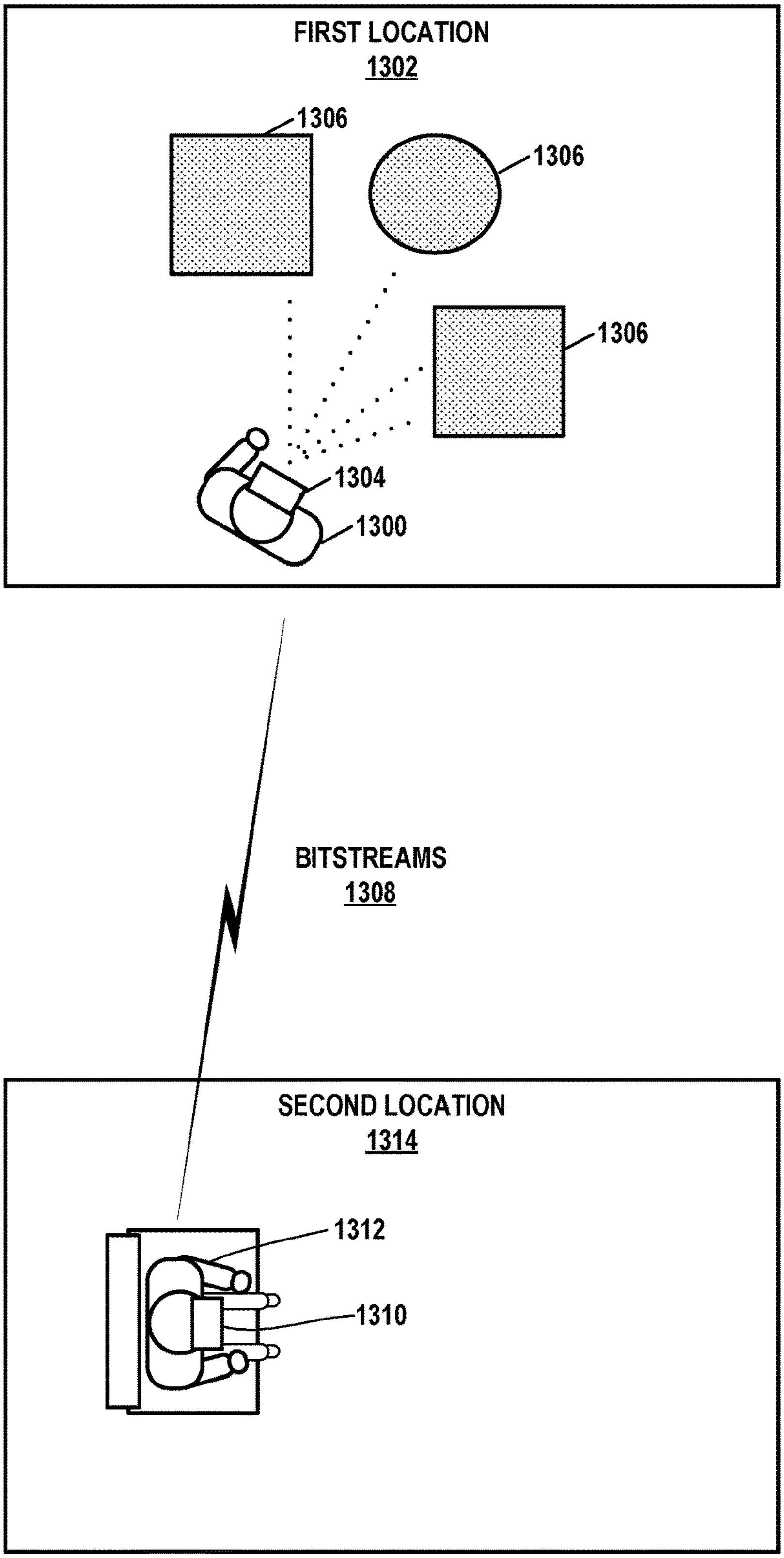
FIG. 13 is a conceptual diagram illustrating an example extended reality system in which one or more techniques of this disclosure may be used.

FIG. 13 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 13, a user 1300 is located in a first location 1302. User 1300 wears an XR headset 1304. As an alternative to XR headset 1304, user 1300 may use a mobile device (e.g., mobile phone, tablet computer, etc.). XR headset 1304 includes a depth detection sensor, such as a range-finding system, that detects positions of points on objects 1306 at location 1302. A data source of XR headset 1304 may use the signals generated by the depth detection sensor to generate a point cloud representation of objects 1306 at location 1302. XR headset 1304 may include a G-PCC encoder (e.g., G-PCC encoder 200 of FIG. 1) that is configured to encode the point cloud to generate bitstreams 1308. Inter prediction and residual prediction, as described in this disclosure may reduce the size of bitstream 1308.

XR headset 1304 may transmit bitstreams 1308 (e.g., via a network such as the Internet) to an XR headset 1310 worn by a user 1312 at a second location 1314. XR headset 1310 may decode bitstreams 1308 to reconstruct the point cloud. XR headset 1310 may use the point cloud to generate an XR visualization (e.g., an AR, MR, VR visualization) representing objects 1306 at location 1302. Thus, in some examples, such as when XR headset 1310 generates an VR visualization, user 1312 may have a 3D immersive experience of location 1302. In some examples, XR headset 1310 may determine a position of a virtual object based on the reconstructed point cloud. For instance, XR headset 1310 may determine, based on the reconstructed point cloud, that an environment (e.g., location 1302) includes a flat surface and then determine that a virtual object (e.g., a cartoon character) is to be positioned on the flat surface. XR headset 1310 may generate an XR visualization in which the virtual object is at the determined position. For instance, XR headset 1310 may show the cartoon character sitting on the flat surface.

Figure 14:
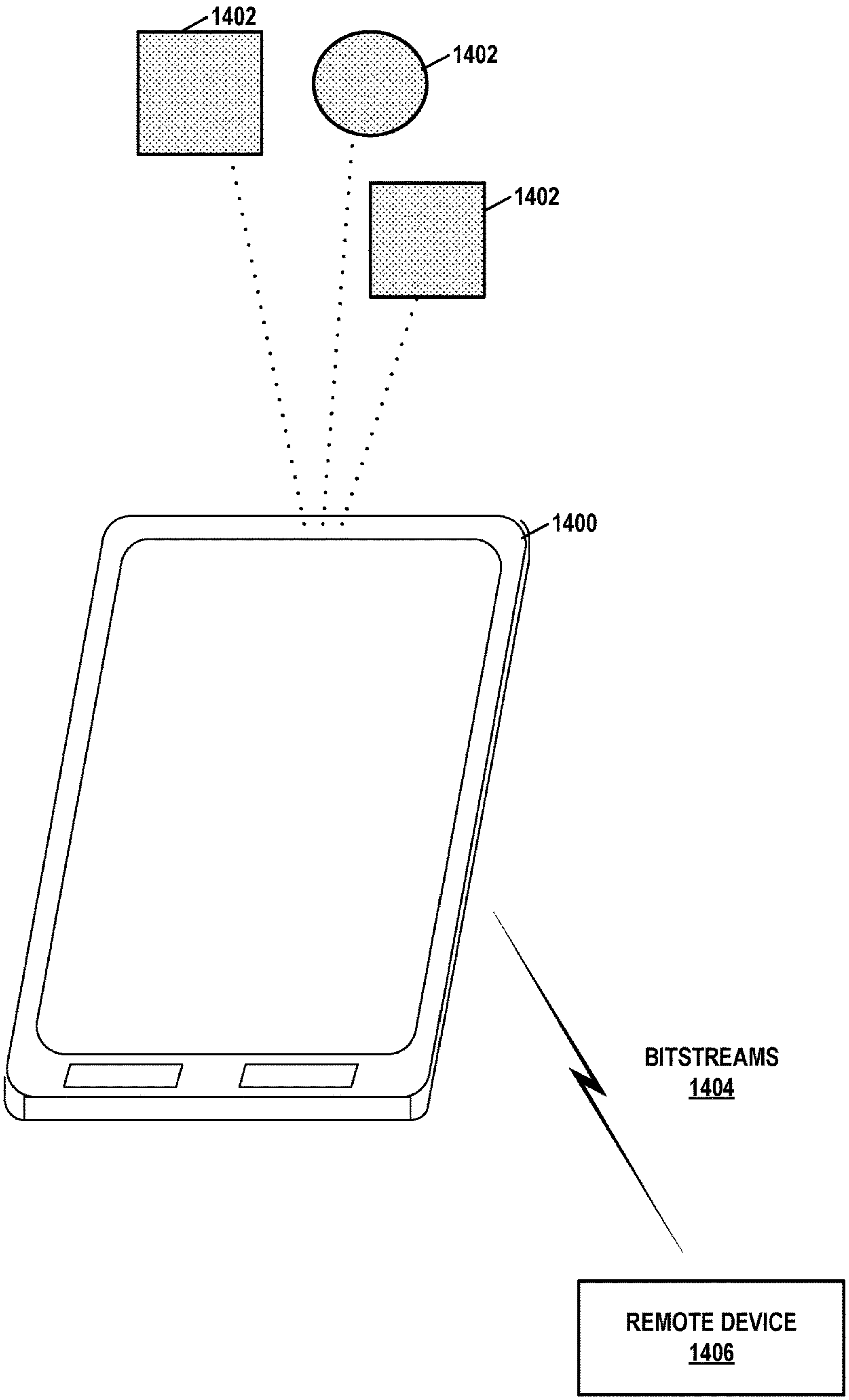
FIG. 14 is a conceptual diagram illustrating an example mobile device system in which one or more techniques of this disclosure may be used.

FIG. 14 is a conceptual diagram illustrating an example mobile device system in which one or more techniques of this disclosure may be used. In the example of FIG. 14, a mobile device 1400 (e.g., a wireless communication device), such as a mobile phone or tablet computer, includes a range-finding system, such as a LIDAR system, that detects positions of points on objects 1402 in an environment of mobile device 1400. A data source of mobile device 1400 may use the signals generated by the depth detection sensor to generate a point cloud representation of objects 1402. Mobile device 1400 may include a G-PCC encoder (e.g., G-PCC encoder 200 of FIG. 1) that is configured to encode the point cloud to generate bitstreams 1404. In the example of FIG. 14, mobile device 1400 may transmit bitstreams to a remote device 1406, such as a server system or other mobile device. Inter prediction and residual prediction, as described in this disclosure may reduce the size of bitstreams 1404. Remote device 1406 may decode bitstreams 1404 to reconstruct the point cloud. Remote device 1406 may use the point cloud for various purposes. For example, remote device 1406 may use the point cloud to generate a map of environment of mobile device 1400. For instance, remote device 1406 may generate a map of an interior of a building based on the reconstructed point cloud. In another example, remote device 1406 may generate imagery (e.g., computer graphics) based on the point cloud. For instance, remote device 1406 may use points of the point cloud as vertices of polygons and use color attributes of the points as the basis for shading the polygons. In some examples, remote device 1406 may use the reconstructed point cloud for facial recognition or other security applications.

This disclosure includes the following non-limiting clauses.

Clause 1A. A method of processing point cloud data, the method comprising: signaling or parsing a syntax element indicative of whether a previous previous frame can be used for inter prediction, wherein the previous previous frame comprises a reference frame of a previous reference frame; and processing the point cloud data based on the syntax element.

Clause 2A. The method of clause 1A, wherein the previous previous frame can be used for inter prediction and the method further comprises: determining that resampling is not applied to a current frame of the point cloud data; and applying global motion parameters signaled with the current frame to the previous previous frame.

Clause 3A. The method of clause 1A, wherein the previous previous frame can be used for inter prediction and the method further comprises: determining that resampling is applied to a current frame of the point cloud data; signaling or parsing a second set of global motion parameters; and applying the second set of global motion parameters to the previous previous frame.

Clause 4A. The method of clause 1A, further comprising: determining that global motion is not enabled; and based on global motion not being enabled, disabling resampling.

Clause 5A. The method of clause 4A, further comprising using an uncompensated reference frame rather than a resampled reference frame.

Clause 6A. The method of any of clauses 1A-5A, further comprising using a next candidate from a reference frame in place of a next next candidate, the next next candidate being a candidate after a first candidate and a second candidate in a inter predictor candidate list.

Clause 7A. The method of any of clauses 1A-3A or 6A, further comprising: determining that global motion compensation is enabled; and signaling or parsing a flag at a frame level or a slice level indicative of whether global motion compensation is to be applied to a current frame of the point cloud data.

Clause 8A. The method of clause 7A, wherein global motion compensation is not to be applied to the current frame and wherein the method further comprises disallowing a last two entries of an inter predictor candidate list.

Clause 9A. The method of clause 8A, further comprising determining that the previous previous frame is not used for inter prediction and wherein disallowing the last two entries of the inter predictor candidate list is based on the previous previous frame not being used for inter prediction.

Clause 10A. The method of clause 1A, further comprising: determining that global motion compensation is disabled; determining that resampling is enabled; based on global motion compensation being disabled and resampling being enabled; selecting a previous resampled reference frame as the reference frame for inter prediction.

Clause 11A. The method of clause 1A, further comprising: determining that global motion compensation is disabled; determining that resampling is disabled; based on global motion compensation being disabled and resampling being disabled; selecting a previous unresampled reference frame as the reference frame for inter prediction.

Clause 12A. The method of clause 1A, further comprising: determining that global motion compensation is enabled; determining that resampling is enabled; based on global motion compensation being enabled and resampling being enabled, selecting a previous resampled reference frame as the reference frame for inter prediction.

Clause 13A. The method of any of clauses 1A-12A, further comprising generating the point cloud.

Clause 14A. A device for processing a point cloud, the device comprising one or more means for performing the method of any of clauses 1A-13A.

Clause 15A. The device of clause 14A, wherein the one or more means comprise one or more processors implemented in circuitry.

Clause 16A. The device of any of clauses 14A or 15A, further comprising a memory to store the data representing the point cloud.

Clause 17A. The device of any of clauses 14A-16A, wherein the device comprises a decoder.

Clause 18A. The device of any of clauses 14A-17A, wherein the device comprises an encoder.

Clause 19A. The device of any of clauses 14A-18A, further comprising a device to generate the point cloud.

Clause 20A. The device of any of clauses 14A-19A, further comprising a display to present imagery based on the point cloud.

Clause 21A. A computer-readable storage medium having stored thereon instructions that, when executed, cause one or more processors to perform the method of any of clauses 1A-13A.

Clause 1B. A method of processing point cloud data, the method comprising: processing a syntax element indicative of whether a previous previous frame can be used for inter prediction for one or more points of the point cloud data, wherein the previous previous frame comprises a reference frame of a previous reference frame; and coding the one or more points based on a determination of whether the previous previous frame can be used for inter prediction for the one or more points.

Clause 2B. The method of clause 1B, wherein the previous previous frame can be used for inter prediction and the method further comprises: determining that resampling is not applied to a current frame of the point cloud data; and applying, to the previous previous frame, a first set of one or more global motion parameters signaled with the current frame.

Clause 3B. The method of clause 1B, wherein the previous previous frame can be used for inter prediction and the method further comprises: determining that resampling is applied to a current frame of the point cloud data; processing a second set of one or more global motion parameters; and applying the second set of one or more global motion parameters to the previous previous frame.

Clause 4B. The method of clause 1B, further comprising: determining that global motion is not enabled; and based on global motion not being enabled, disabling resampling.

Clause 5B. The method of clause 4B, further comprising using an uncompensated reference frame rather than a resampled reference frame.

Clause 6B. The method of any of clauses 1B-5B, further comprising using a next candidate from a reference frame in place of a next next candidate, the next next candidate being a candidate after a first candidate and a second candidate in a inter predictor candidate list.

Clause 7B. The method of any of clauses 1B-3B or 6B, further comprising: determining that global motion compensation is enabled; and processing a flag at a frame level or a slice level indicative of whether global motion compensation is to be applied to a current frame of the point cloud data.

Clause 8B. The method of clause 7B, wherein global motion compensation is not to be applied to the current frame and wherein the method further comprises disallowing a last two entries of an inter predictor candidate list.

Clause 9B. The method of clause 8B, further comprising determining that the previous previous frame is not used for inter prediction and wherein disallowing the last two entries of the inter predictor candidate list is based on the previous previous frame not being used for inter prediction.

Clause 10B. The method of clause 1B, further comprising: determining that global motion compensation is disabled; determining that resampling is enabled; and based on global motion compensation being disabled and resampling being enabled, selecting a previous resampled reference frame as the reference frame for inter prediction.

Clause 11B. The method of clause 1B, further comprising: determining that global motion compensation is disabled; determining that resampling is disabled; and based on global motion compensation being disabled and resampling being disabled, selecting a previous unresampled reference frame as the reference frame for inter prediction.

Clause 12B. The method of clause 1B, further comprising: determining that global motion compensation is enabled; determining that resampling is enabled; and based on global motion compensation being enabled and resampling being enabled, selecting a previous resampled reference frame as the reference frame for inter prediction.

Clause 13B. The method of any of clauses 1B-12B, wherein code comprises decode and process the syntax element comprises parse the syntax element to determine a value of the syntax element indicative of whether the previous previous frame can be used for inter prediction.

Clause 14B. The method of any of clauses 1B-12B, wherein code comprises encode and process the syntax element comprises encode the syntax element to include a value indicative of whether the previous previous frame can be used for inter prediction.

Clause 15B. A device for processing a point cloud, the device comprising: one or more memories configured to store point cloud data; and one or more processors implemented in circuitry and communicatively coupled to the one or more memories, the one or more processors configured to: process a syntax element indicative of whether a previous previous frame can be used for inter prediction for one or more points of the point cloud data, wherein the previous previous frame comprises a reference frame of a previous reference frame; and code the one or more points based on a determination of whether the previous previous frame can be used for inter prediction for the one or more points.

Clause 16B. The device of clause 15B, wherein the previous previous frame can be used for inter prediction and the one or more processors are further configured to: determine that resampling is not applied to a current frame of the point cloud data; and apply, to the previous previous frame, a first set of one or more global motion parameters signaled with the current frame.

Clause 17B. The device of clause 15B, wherein the previous previous frame can be used for inter prediction and the one or more processors are further configured to: determine that resampling is applied to a current frame of the point cloud data; process a second set of one or more global motion parameters; and apply the second set of one or more global motion parameters to the previous previous frame.

Clause 18B. The device of any of clauses 15B-17B, wherein the device comprises a decoder configured to parse the syntax element, and wherein as part of parsing the syntax element, the one or more processors are configured determine a value of the syntax element indicative of whether the previous previous frame can be used for inter prediction.

Clause 19B. The device of any of clauses 15B-17B, wherein the device comprises an encoder configured to signal the syntax element, and wherein the syntax element has a value indicative of whether the previous previous frame can be used for inter prediction.

Clause 20B. Non-transitory computer-readable storage media comprising instructions, which when executed, cause one or more processors to: process a syntax element indicative of whether a previous previous frame can be used for inter prediction for one or more points of point cloud data, wherein the previous previous frame comprises a reference frame of a previous reference frame; and code the one or more points based on a determination of whether the previous previous frame can be used for inter prediction for the one or more points.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing point cloud data, the method comprising:
processing a syntax element indicative that a previous previous frame can be used for inter prediction for one or more points of a current frame of the point cloud data, wherein the previous previous frame comprises a reference frame of a previous reference frame;
determining that resampling is not applied to the current frame of the point cloud data;
applying, to the previous previous frame, a first set of one or more global motion parameters signaled with the current frame to generate a global motion compensated previous previous frame, wherein applying the first set of one or more global motion parameters signaled with the current frame to generate the global motion compensated previous previous frame is based the determination that resampling is not applied to the current frame; and
coding the one or more points of the current frame based on the global motion compensated previous previous frame.

2. The method of claim 1, wherein the current frame is a first current frame, the syntax element is a first syntax element, the previous previous frame is a first previous previous frame, the reference frame is a first reference frame, the previous reference frame is a first previous reference frame, and the global motion compensated previous previous frame is a global motion compensated first previous previous frame the method further comprising:
processing a second syntax element indicative that a second previous previous frame can be used for inter prediction for one or more points of a second current frame of the point cloud data, wherein the second previous previous frame comprises a second reference frame of a second previous reference frame;
determining that resampling is applied to the second current frame of the point cloud data;
processing a second set of one or more global motion parameters;
applying the second set of one or more global motion parameters to the second previous previous frame to generate a global motion compensated second previous previous frame; and
coding the one or more points of the second current frame based on the global motion compensated second previous previous frame.

3. The method of claim 1, wherein the current frame is a first current frame, the method further comprising:
determining that global motion is not enabled for a second current frame of the point cloud data; and
based on global motion not being enabled, disabling resampling for the second current frame of the point cloud data.

4. The method of claim 3, further comprising using an uncompensated reference frame rather than a resampled reference frame for the second current frame of the point cloud data.

5. The method of claim 1, further comprising using a next candidate from a reference frame in place of a next next candidate, the next next candidate being a candidate after a first candidate and a second candidate in a inter predictor candidate list.

6. The method of claim 1, further comprising:
determining that global motion compensation is enabled; and
processing a flag at a frame level or a slice level indicative of whether global motion compensation is to be applied to the current frame of the point cloud data.

7. The method of claim 6, wherein the current frame is a first current frame, wherein global motion compensation is not to be applied to a second current frame and wherein the method further comprises disallowing a last two entries of an inter predictor candidate list for the second current frame.

8. The method of claim 7, wherein the previous previous frame is a first previous previous frame, the method further comprising determining that a second previous previous frame is not used for inter prediction for the second current frame and wherein disallowing the last two entries of the inter predictor candidate list for the second current frame is based on the previous previous frame not being used for inter prediction for the second current frame.

9. The method of claim 1, wherein the current frame is a first current frame, the method further comprising:
determining that global motion compensation is disabled for a second current frame;
determining that resampling is enabled for the second current frame; and
based on global motion compensation being disabled for the second current frame and resampling being enabled for the second current frame, selecting a previous resampled reference frame as the reference frame for inter prediction for the second current frame.

10. The method of claim 1, wherein the current frame is a first current frame, the method further comprising:
determining that global motion compensation is disabled for a second current frame;
determining that resampling is disabled for the second current frame; and
based on global motion compensation being disabled for the second current frame and resampling being disabled for the second current frame, selecting a previous unresampled reference frame as the reference frame for inter prediction for the second current frame.

11. The method of claim 1, wherein the current frame is a first current frame, the method further comprising:
determining that global motion compensation is enabled for a second current frame;
determining that resampling is enabled for the second current frame; and based on global motion compensation being enabled for the second current frame and resampling being enabled for the second current frame, selecting a previous resampled reference frame as the reference frame for inter prediction for the second current frame.

12. The method of claim 1, wherein code comprises decode and process the syntax element comprises parse the syntax element to determine a value of the syntax element indicative that the previous previous frame can be used for inter prediction.

13. The method of claim 1, wherein code comprises encode and process the syntax element comprises encode the syntax element to include a value indicative that the previous previous frame can be used for inter prediction.

14. A device for processing a point cloud, the device comprising:

one or more memories configured to store point cloud data; and one or more processors implemented in circuitry and communicatively coupled to the one or more memories, the one or more processors configured to:

process a syntax element indicative that a previous previous frame can be used for inter prediction for one or more points of a current frame of the point cloud data, wherein the previous previous frame comprises a reference frame of a previous reference frame;

determine that resampling is not applied to the current frame of the point cloud data;

apply, to the previous previous frame, a first set of one or more global motion parameters signaled with the current frame to generate a global motion compensated previous previous frame, wherein applying the first set of one or more global motion parameters signaled with the current frame to generate the global motion compensated previous previous frame is based the determination that resampling is not applied to the current frame; and code the one or more points of the current frame based on the global motion compensated previous previous frame.

15. The device of claim 14, wherein the current frame is a first current frame, the syntax element is a first syntax element, the previous previous frame is a first previous previous frame, the reference frame is a first reference frame, the previous reference frame is a first previous reference frame, and the global motion compensated previous previous frame is a global motion compensated first previous previous frame, and wherein the one or more processors are further configured to:

process a second syntax element indicative that a second previous previous frame can be used for inter prediction for one or more points of a second current frame of the point cloud data, wherein the second previous previous frame comprises a second reference frame of a second previous reference frame;

determine that resampling is applied to the second current frame of the point cloud data;

process a second set of one or more global motion parameters;

apply the second set of one or more global motion parameters to the second previous previous frame to generate a global motion compensated second previous previous frame; and code the one or more points of the second current frame based on the global motion compensated second previous previous frame.

16. The device of claim 14, wherein the device comprises a decoder configured to parse the syntax element, and wherein as part of parsing the syntax element, the one or more processors are configured determine a value of the syntax element indicative that the previous previous frame can be used for inter prediction.

17. The device of claim 14, wherein the device comprises an encoder configured to signal the syntax element, and wherein the syntax element has a value indicative that the previous previous frame can be used for inter prediction.

18. Non-transitory computer-readable storage media comprising instructions, which when executed, cause one or more processors to:

process a syntax element indicative that a previous previous frame can be used for inter prediction for one or more points of a current frame of point cloud data, wherein the previous previous frame comprises a reference frame of a previous reference frame;

determine that resampling is not applied to the current frame of the point cloud data;

apply, to the previous previous frame, a first set of one or more global motion parameters signaled with the current frame to generate a global motion compensated previous previous frame, wherein applying the first set of one or more global motion parameters signaled with the current frame to generate the global motion compensated previous previous frame is based the determination that resampling is not applied to the current frame; and code the one or more points of the current frame based on the global motion compensated previous previous frame.

* * * * *